US008877359B2

(12) United States Patent
Saito et al.

(10) Patent No.: US 8,877,359 B2
(45) Date of Patent: Nov. 4, 2014

(54) MAGNETIC DISK AND METHOD FOR MANUFACTURING SAME

(75) Inventors: Chiyo Saito, Tokyo (JP); Tokichiro Sato, Singapore (SG); Takenori Kajiwara, Tokyo (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 300 days.

(21) Appl. No.: 13/133,124

(22) PCT Filed: Dec. 7, 2009

(86) PCT No.: PCT/JP2009/070499
§ 371 (c)(1),
(2), (4) Date: Aug. 24, 2011

(87) PCT Pub. No.: WO2010/064724
PCT Pub. Date: Jun. 10, 2010

(65) Prior Publication Data
US 2011/0311841 A1    Dec. 22, 2011

(30) Foreign Application Priority Data

Dec. 5, 2008    (JP) ................................ 2008-311120
Mar. 31, 2009    (JP) ................................ 2009-087762

(51) Int. Cl.
*G11B 5/65*    (2006.01)
*G11B 5/66*    (2006.01)
*G11B 5/855*    (2006.01)
*G11B 5/851*    (2006.01)

(52) U.S. Cl.
CPC . *G11B 5/855* (2013.01); *G11B 5/65* (2013.01); *G11B 5/66* (2013.01); *G11B 5/851* (2013.01)
USPC ..................... 428/828.1; 428/830; 428/832.1; 428/836.2

(58) Field of Classification Search
None
See application file for complete search history.

(56) References Cited

U.S. PATENT DOCUMENTS 5,741,403 A  *  4/1998  Tenhover et al. .......... 204/192.2
5,972,461 A  *  10/1999  Sandstrom ................. 428/848.9
6,013,161 A       1/2000  Chen et al.

(Continued)

FOREIGN PATENT DOCUMENTS

JP    2004-259423 A    9/2004
JP    2004-310910 A    11/2004

(Continued)

OTHER PUBLICATIONS

International Search Report, PCT/JP2009-070499, dated Mar. 2, 2010.

(Continued)

*Primary Examiner* — Kevin Bernatz

(57) ABSTRACT

Provided are a magnetic disk comprising a granular magnetic recording layer which causes less noise even with a recording capacity thereof of 250 G or more bits per square inch; and a method for manufacturing the same. The magnetic disk according to the present invention comprises: a granular magnetic recording layer (20) which is formed on a disk substrate 10 directly or via an intermediate layer and which has non-magnetic regions between granular columnar particles; and an auxiliary recording layer (22) which is formed on the granular magnetic recording layer 20 and which causes exchange interaction among the granular columnar particles, wherein the auxiliary recording layer (22) contains 0.1 to 3 moles of oxygen.

14 Claims, 6 Drawing Sheets

(56) References Cited

U.S. PATENT DOCUMENTS

| | | | |
|---|---|---|---|
| 6,063,248 A | 5/2000 | Bourez et al. | |
| 6,068,891 A | 5/2000 | O'Dell et al. | |
| 6,086,730 A | 7/2000 | Liu et al. | |
| 6,099,981 A | 8/2000 | Nishimori | |
| 6,103,404 A | 8/2000 | Ross et al. | |
| 6,117,499 A | 9/2000 | Wong et al. | |
| 6,136,403 A | 10/2000 | Prabhakara et al. | |
| 6,143,375 A | 11/2000 | Ross et al. | |
| 6,145,849 A | 11/2000 | Bae et al. | |
| 6,146,737 A | 11/2000 | Malhotra et al. | |
| 6,146,755 A * | 11/2000 | Guha et al. | 428/332 |
| 6,149,696 A | 11/2000 | Jia | |
| 6,150,015 A | 11/2000 | Bertero et al. | |
| 6,156,404 A | 12/2000 | Ross et al. | |
| 6,159,076 A | 12/2000 | Sun et al. | |
| 6,164,118 A | 12/2000 | Suzuki et al. | |
| 6,194,045 B1 * | 2/2001 | Annacone et al. | 428/64.1 |
| 6,200,441 B1 | 3/2001 | Gornicki et al. | |
| 6,204,995 B1 | 3/2001 | Hokkyo et al. | |
| 6,206,765 B1 | 3/2001 | Sanders et al. | |
| 6,210,819 B1 | 4/2001 | Lal et al. | |
| 6,216,709 B1 | 4/2001 | Fung et al. | |
| 6,221,119 B1 | 4/2001 | Homola | |
| 6,248,395 B1 | 6/2001 | Homola et al. | |
| 6,261,681 B1 | 7/2001 | Suekane et al. | |
| 6,270,885 B1 | 8/2001 | Hokkyo et al. | |
| 6,274,063 B1 | 8/2001 | Li et al. | |
| 6,283,838 B1 | 9/2001 | Blake et al. | |
| 6,287,429 B1 | 9/2001 | Moroishi et al. | |
| 6,290,573 B1 | 9/2001 | Suzuki | |
| 6,299,947 B1 | 10/2001 | Suzuki et al. | |
| 6,303,217 B1 | 10/2001 | Malhotra et al. | |
| 6,309,765 B1 | 10/2001 | Suekane et al. | |
| 6,358,636 B1 | 3/2002 | Yang et al. | |
| 6,362,452 B1 | 3/2002 | Suzuki et al. | |
| 6,363,599 B1 | 4/2002 | Bajorek | |
| 6,365,012 B1 | 4/2002 | Sato et al. | |
| 6,381,090 B1 | 4/2002 | Suzuki et al. | |
| 6,381,092 B1 | 4/2002 | Suzuki | |
| 6,387,483 B1 | 5/2002 | Hokkyo et al. | |
| 6,391,213 B1 | 5/2002 | Homola | |
| 6,395,349 B1 | 5/2002 | Salamon | |
| 6,403,919 B1 | 6/2002 | Salamon | |
| 6,408,677 B1 | 6/2002 | Suzuki | |
| 6,426,157 B1 | 7/2002 | Hokkyo et al. | |
| 6,429,984 B1 | 8/2002 | Alex | |
| 6,468,670 B1 * | 10/2002 | Ikeda et al. | 428/611 |
| 6,482,330 B1 | 11/2002 | Bajorek | |
| 6,482,505 B1 | 11/2002 | Bertero et al. | |
| 6,500,567 B1 | 12/2002 | Bertero et al. | |
| 6,528,124 B1 | 3/2003 | Nguyen | |
| 6,548,821 B1 | 4/2003 | Treves et al. | |
| 6,552,871 B2 | 4/2003 | Suzuki et al. | |
| 6,565,719 B1 | 5/2003 | Lairson et al. | |
| 6,566,674 B1 | 5/2003 | Treves et al. | |
| 6,571,806 B2 | 6/2003 | Rosano et al. | |
| 6,628,466 B2 | 9/2003 | Alex | |
| 6,664,503 B1 | 12/2003 | Hsieh et al. | |
| 6,670,055 B2 | 12/2003 | Tomiyasu et al. | |
| 6,682,807 B2 | 1/2004 | Lairson et al. | |
| 6,683,754 B2 | 1/2004 | Suzuki et al. | |
| 6,730,420 B1 | 5/2004 | Bertero et al. | |
| 6,743,528 B2 | 6/2004 | Suekane et al. | |
| 6,759,138 B2 | 7/2004 | Tomiyasu et al. | |
| 6,778,353 B1 | 8/2004 | Harper | |
| 6,795,274 B1 | 9/2004 | Hsieh et al. | |
| 6,855,232 B2 | 2/2005 | Jairson et al. | |
| 6,857,937 B2 | 2/2005 | Bajorek | |
| 6,893,748 B2 | 5/2005 | Bertero et al. | |
| 6,899,959 B2 | 5/2005 | Bertero et al. | |
| 6,916,558 B2 | 7/2005 | Umezawa et al. | |
| 6,939,120 B1 | 9/2005 | Harper | |
| 6,946,191 B2 | 9/2005 | Morikawa et al. | |
| 6,967,798 B2 | 11/2005 | Homola et al. | |
| 6,972,135 B2 | 12/2005 | Homola | |
| 7,004,827 B1 | 2/2006 | Suzuki et al. | |
| 7,006,323 B1 | 2/2006 | Suzuki | |
| 7,016,154 B2 | 3/2006 | Nishihira | |
| 7,019,924 B2 | 3/2006 | McNeil et al. | |
| 7,045,215 B2 | 5/2006 | Shimokawa | |
| 7,070,870 B2 | 7/2006 | Bertero et al. | |
| 7,090,934 B2 | 8/2006 | Hokkyo et al. | |
| 7,099,112 B1 | 8/2006 | Harper | |
| 7,105,241 B2 | 9/2006 | Shimokawa et al. | |
| 7,119,990 B2 | 10/2006 | Bajorek et al. | |
| 7,147,790 B2 | 12/2006 | Wachenschwanz et al. | |
| 7,161,753 B2 | 1/2007 | Wachenschwanz et al. | |
| 7,166,319 B2 | 1/2007 | Ishiyama | |
| 7,166,374 B2 | 1/2007 | Suekane et al. | |
| 7,169,487 B2 | 1/2007 | Kawai et al. | |
| 7,174,775 B2 | 2/2007 | Ishiyama | |
| 7,179,549 B2 | 2/2007 | Malhotra et al. | |
| 7,184,139 B2 | 2/2007 | Treves et al. | |
| 7,196,860 B2 | 3/2007 | Alex | |
| 7,199,977 B2 | 4/2007 | Suzuki et al. | |
| 7,208,236 B2 | 4/2007 | Morikawa et al. | |
| 7,220,500 B1 | 5/2007 | Tomiyasu et al. | |
| 7,229,266 B2 | 6/2007 | Harper | |
| 7,239,970 B2 | 7/2007 | Treves et al. | |
| 7,252,897 B2 | 8/2007 | Shimokawa et al. | |
| 7,277,254 B2 | 10/2007 | Shimokawa et al. | |
| 7,281,920 B2 | 10/2007 | Homola et al. | |
| 7,292,329 B2 | 11/2007 | Treves et al. | |
| 7,301,726 B1 | 11/2007 | Suzuki | |
| 7,302,148 B2 | 11/2007 | Treves et al. | |
| 7,305,119 B2 | 12/2007 | Treves et al. | |
| 7,314,404 B2 | 1/2008 | Singh et al. | |
| 7,320,584 B1 | 1/2008 | Harper et al. | |
| 7,329,114 B2 | 2/2008 | Harper et al. | |
| 7,375,362 B2 | 5/2008 | Treves et al. | |
| 7,420,886 B2 | 9/2008 | Tomiyasu et al. | |
| 7,425,719 B2 | 9/2008 | Treves et al. | |
| 7,471,484 B2 | 12/2008 | Wachenschwanz et al. | |
| 7,498,062 B2 | 3/2009 | Calcaterra et al. | |
| 7,531,485 B2 | 5/2009 | Hara et al. | |
| 7,537,846 B2 | 5/2009 | Ishiyama et al. | |
| 7,549,209 B2 | 6/2009 | Wachenschwanz et al. | |
| 7,569,490 B2 | 8/2009 | Staud | |
| 7,582,368 B2 * | 9/2009 | Berger et al. | 428/827 |
| 7,597,792 B2 | 10/2009 | Homola et al. | |
| 7,597,973 B2 | 10/2009 | Ishiyama | |
| 7,608,193 B2 | 10/2009 | Wachenschwanz et al. | |
| 7,632,087 B2 | 12/2009 | Homola | |
| 7,656,615 B2 | 2/2010 | Wachenschwanz et al. | |
| 7,682,546 B2 | 3/2010 | Harper | |
| 7,684,152 B2 | 3/2010 | Suzuki et al. | |
| 7,686,606 B2 | 3/2010 | Harper et al. | |
| 7,686,991 B2 | 3/2010 | Harper | |
| 7,695,833 B2 | 4/2010 | Ishiyama | |
| 7,722,968 B2 | 5/2010 | Ishiyama | |
| 7,733,605 B2 | 6/2010 | Suzuki et al. | |
| 7,736,768 B2 | 6/2010 | Ishiyama | |
| 7,755,861 B1 | 7/2010 | Li et al. | |
| 7,758,732 B1 | 7/2010 | Calcaterra et al. | |
| 7,833,639 B2 | 11/2010 | Sonobe et al. | |
| 7,833,641 B2 | 11/2010 | Tomiyasu et al. | |
| 7,910,159 B2 | 3/2011 | Jung | |
| 7,911,736 B2 | 3/2011 | Bajorek | |
| 7,924,519 B2 | 4/2011 | Lambert | |
| 7,944,165 B1 | 5/2011 | O'Dell | |
| 7,944,643 B1 | 5/2011 | Jiang et al. | |
| 7,955,723 B2 | 6/2011 | Umezawa et al. | |
| 7,983,003 B2 | 7/2011 | Sonobe et al. | |
| 7,993,497 B2 | 8/2011 | Moroishi et al. | |
| 7,993,765 B2 | 8/2011 | Kim et al. | |
| 7,998,912 B2 | 8/2011 | Chen et al. | |
| 8,002,901 B1 | 8/2011 | Chen et al. | |
| 8,003,237 B2 | 8/2011 | Sonobe et al. | |
| 8,012,920 B2 | 9/2011 | Shimokawa | |
| 8,038,863 B2 | 10/2011 | Homola | |
| 8,057,926 B2 | 11/2011 | Ayama et al. | |
| 8,062,778 B2 | 11/2011 | Suzuki et al. | |
| 8,064,156 B1 | 11/2011 | Suzuki et al. | |
| 8,076,013 B2 | 12/2011 | Sonobe et al. | |

(56) References Cited

U.S. PATENT DOCUMENTS

| | | | |
|---|---|---|---|
| 8,092,931 B2 | 1/2012 | Ishiyama et al. | |
| 8,100,685 B1 | 1/2012 | Harper et al. | |
| 8,101,054 B2 | 1/2012 | Chen et al. | |
| 8,110,298 B1 * | 2/2012 | Choe et al. | 428/827 |
| 8,119,263 B2 * | 2/2012 | Nolan et al. | 428/829 |
| 8,125,723 B1 | 2/2012 | Nichols et al. | |
| 8,125,724 B1 | 2/2012 | Nichols et al. | |
| 8,137,517 B1 | 3/2012 | Bourez | |
| 8,142,916 B2 * | 3/2012 | Umezawa et al. | 428/831.2 |
| 8,163,093 B1 | 4/2012 | Chen et al. | |
| 8,171,949 B1 | 5/2012 | Lund et al. | |
| 8,173,282 B1 | 5/2012 | Sun et al. | |
| 8,178,480 B2 | 5/2012 | Hamakubo et al. | |
| 8,202,636 B2 * | 6/2012 | Choe et al. | 428/828.1 |
| 8,206,789 B2 | 6/2012 | Suzuki | |
| 8,218,260 B2 | 7/2012 | Iamratanakul et al. | |
| 8,247,095 B2 | 8/2012 | Champion et al. | |
| 8,257,783 B2 | 9/2012 | Suzuki et al. | |
| 8,298,609 B1 | 10/2012 | Liew et al. | |
| 8,298,689 B2 | 10/2012 | Sonobe et al. | |
| 8,309,239 B2 | 11/2012 | Umezawa et al. | |
| 8,316,668 B1 | 11/2012 | Chan et al. | |
| 8,331,056 B2 | 12/2012 | O'Dell | |
| 8,354,618 B1 | 1/2013 | Chen et al. | |
| 8,367,228 B2 | 2/2013 | Sonobe et al. | |
| 8,383,209 B2 | 2/2013 | Ayama | |
| 8,394,243 B1 | 3/2013 | Jung et al. | |
| 8,397,751 B1 | 3/2013 | Chan et al. | |
| 8,399,809 B1 | 3/2013 | Bourez | |
| 8,402,638 B1 | 3/2013 | Treves et al. | |
| 8,404,056 B1 | 3/2013 | Chen et al. | |
| 8,404,369 B2 | 3/2013 | Ruffini et al. | |
| 8,404,370 B2 | 3/2013 | Sato et al. | |
| 8,406,918 B2 | 3/2013 | Tan et al. | |
| 8,414,966 B2 | 4/2013 | Yasumori et al. | |
| 8,425,975 B2 | 4/2013 | Ishiyama | |
| 8,431,257 B2 | 4/2013 | Kim et al. | |
| 8,431,258 B2 | 4/2013 | Onoue et al. | |
| 8,453,315 B2 | 6/2013 | Kajiwara et al. | |
| 8,488,276 B1 | 7/2013 | Jung et al. | |
| 8,491,800 B1 | 7/2013 | Dorsey | |
| 8,492,009 B1 | 7/2013 | Homola et al. | |
| 8,492,011 B2 | 7/2013 | Itoh et al. | |
| 8,496,466 B1 | 7/2013 | Treves et al. | |
| 8,517,364 B1 | 8/2013 | Crumley et al. | |
| 8,517,657 B2 | 8/2013 | Chen et al. | |
| 8,524,052 B1 | 9/2013 | Tan et al. | |
| 8,530,065 B1 | 9/2013 | Chernyshov et al. | |
| 8,546,000 B2 | 10/2013 | Umezawa | |
| 8,551,253 B2 | 10/2013 | Na'im et al. | |
| 8,551,627 B2 | 10/2013 | Shimada et al. | |
| 8,556,566 B1 | 10/2013 | Suzuki et al. | |
| 8,559,131 B2 | 10/2013 | Masuda et al. | |
| 8,562,748 B1 | 10/2013 | Chen et al. | |
| 8,565,050 B1 | 10/2013 | Bertero et al. | |
| 8,570,844 B1 | 10/2013 | Yuan et al. | |
| 8,580,410 B2 | 11/2013 | Onoue | |
| 8,584,687 B1 | 11/2013 | Chen et al. | |
| 8,591,709 B1 | 11/2013 | Lim et al. | |
| 8,592,061 B2 | 11/2013 | Onoue et al. | |
| 8,596,287 B1 | 12/2013 | Chen et al. | |
| 8,597,723 B1 | 12/2013 | Jung et al. | |
| 8,603,649 B2 | 12/2013 | Onoue | |
| 8,603,650 B2 | 12/2013 | Sonobe et al. | |
| 8,605,388 B2 | 12/2013 | Yasumori et al. | |
| 8,605,555 B1 | 12/2013 | Chernyshov et al. | |
| 8,608,147 B1 | 12/2013 | Yap et al. | |
| 8,609,263 B1 | 12/2013 | Chernyshov et al. | |
| 8,619,381 B2 | 12/2013 | Moser et al. | |
| 8,623,528 B2 | 1/2014 | Umezawa et al. | |
| 8,623,529 B2 | 1/2014 | Suzuki | |
| 8,634,155 B2 | 1/2014 | Yasumori et al. | |
| 8,658,003 B1 | 2/2014 | Bourez | |
| 8,658,292 B1 | 2/2014 | Mallary et al. | |
| 8,665,541 B2 | 3/2014 | Saito | |
| 8,668,953 B1 | 3/2014 | Buechel-Rimmel | |
| 8,674,327 B1 | 3/2014 | Poon et al. | |
| 8,685,214 B1 | 4/2014 | Moh et al. | |
| 2002/0060883 A1 | 5/2002 | Suzuki | |
| 2003/0022024 A1 | 1/2003 | Wachenschwanz | |
| 2004/0022387 A1 | 2/2004 | Weikle | |
| 2004/0132301 A1 | 7/2004 | Harper et al. | |
| 2004/0202793 A1 | 10/2004 | Harper et al. | |
| 2004/0202865 A1 | 10/2004 | Homola et al. | |
| 2004/0209123 A1 | 10/2004 | Bajorek et al. | |
| 2004/0209470 A1 | 10/2004 | Bajorek | |
| 2005/0036223 A1 | 2/2005 | Wachenschwanz et al. | |
| 2005/0142990 A1 | 6/2005 | Homola | |
| 2005/0150862 A1 | 7/2005 | Harper et al. | |
| 2005/0151282 A1 | 7/2005 | Harper et al. | |
| 2005/0151283 A1 | 7/2005 | Bajorek et al. | |
| 2005/0151300 A1 | 7/2005 | Harper et al. | |
| 2005/0155554 A1 | 7/2005 | Saito | |
| 2005/0167867 A1 | 8/2005 | Bajorek et al. | |
| 2005/0249870 A1 * | 11/2005 | Kawada | 427/128 |
| 2005/0263401 A1 | 12/2005 | Olsen et al. | |
| 2006/0147758 A1 | 7/2006 | Jung et al. | |
| 2006/0181697 A1 | 8/2006 | Treves et al. | |
| 2006/0207890 A1 | 9/2006 | Staud | |
| 2007/0070549 A1 | 3/2007 | Suzuki et al. | |
| 2007/0245909 A1 | 10/2007 | Homola | |
| 2008/0075845 A1 | 3/2008 | Sonobe et al. | |
| 2008/0093760 A1 | 4/2008 | Harper et al. | |
| 2009/0080110 A1 * | 3/2009 | Berger et al. | 360/125.02 |
| 2009/0110961 A1 * | 4/2009 | Shibata et al. | 428/828 |
| 2009/0117408 A1 | 5/2009 | Umezawa et al. | |
| 2009/0136784 A1 | 5/2009 | Suzuki et al. | |
| 2009/0169922 A1 | 7/2009 | Ishiyama | |
| 2009/0191331 A1 | 7/2009 | Umezawa et al. | |
| 2009/0202866 A1 | 8/2009 | Kim et al. | |
| 2009/0311557 A1 | 12/2009 | Onoue et al. | |
| 2010/0143752 A1 | 6/2010 | Ishibashi et al. | |
| 2010/0190035 A1 * | 7/2010 | Sonobe et al. | 428/827 |
| 2010/0196619 A1 | 8/2010 | Ishiyama | |
| 2010/0196740 A1 | 8/2010 | Ayama et al. | |
| 2010/0209601 A1 | 8/2010 | Shimokawa et al. | |
| 2010/0215992 A1 | 8/2010 | Horikawa et al. | |
| 2010/0232065 A1 | 9/2010 | Suzuki et al. | |
| 2010/0247965 A1 | 9/2010 | Onoue | |
| 2010/0261039 A1 | 10/2010 | Itoh et al. | |
| 2010/0279151 A1 | 11/2010 | Sakamoto et al. | |
| 2010/0300884 A1 | 12/2010 | Homola et al. | |
| 2010/0304186 A1 | 12/2010 | Shimokawa | |
| 2011/0097603 A1 | 4/2011 | Onoue | |
| 2011/0097604 A1 | 4/2011 | Onoue | |
| 2011/0171495 A1 | 7/2011 | Tachibana et al. | |
| 2011/0206947 A1 | 8/2011 | Tachibana et al. | |
| 2011/0212346 A1 | 9/2011 | Onoue et al. | |
| 2011/0223446 A1 | 9/2011 | Onoue et al. | |
| 2011/0244119 A1 | 10/2011 | Umezawa et al. | |
| 2011/0299194 A1 | 12/2011 | Aniya et al. | |
| 2011/0311841 A1 | 12/2011 | Saito et al. | |
| 2012/0069466 A1 | 3/2012 | Okamoto et al. | |
| 2012/0070692 A1 | 3/2012 | Sato et al. | |
| 2012/0077060 A1 | 3/2012 | Ozawa | |
| 2012/0127599 A1 | 5/2012 | Shimokawa et al. | |
| 2012/0127601 A1 | 5/2012 | Suzuki et al. | |
| 2012/0129009 A1 | 5/2012 | Sato et al. | |
| 2012/0140359 A1 | 6/2012 | Tachibana | |
| 2012/0141833 A1 | 6/2012 | Umezawa et al. | |
| 2012/0141835 A1 | 6/2012 | Sakamoto | |
| 2012/0148875 A1 | 6/2012 | Hamakubo et al. | |
| 2012/0156523 A1 | 6/2012 | Seki et al. | |
| 2012/0164488 A1 | 6/2012 | Shin et al. | |
| 2012/0170152 A1 | 7/2012 | Sonobe et al. | |
| 2012/0171369 A1 | 7/2012 | Koike et al. | |
| 2012/0175243 A1 | 7/2012 | Fukuura et al. | |
| 2012/0189872 A1 | 7/2012 | Umezawa et al. | |
| 2012/0196049 A1 | 8/2012 | Azuma et al. | |
| 2012/0207919 A1 | 8/2012 | Sakamoto et al. | |
| 2012/0225217 A1 | 9/2012 | Itoh et al. | |
| 2012/0251842 A1 | 10/2012 | Yuan et al. | |
| 2012/0251846 A1 | 10/2012 | Desai et al. | |
| 2012/0276417 A1 | 11/2012 | Shimokawa et al. | |

(56) References Cited

U.S. PATENT DOCUMENTS

| | | |
|---|---|---|
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |

FOREIGN PATENT DOCUMENTS

| | | |
|---|---|---|
| JP | 2005-100537 | 4/2005 |
| JP | 2006-309922 | 11/2006 |
| JP | 2007-087575 A | 4/2007 |
| JP | 2008-084432 | 4/2008 |
| JP | 2008-276917 | 11/2008 |
| JP | 2008-287829 A | 11/2008 |
| JP | 2008-293573 A | 12/2008 |
| JP | 2009-059402 A | 3/2009 |
| WO | 2009/031630 A1 | 3/2009 |

OTHER PUBLICATIONS

Japanese Office Action dated Dec. 24, 2013 for related Japanese Application No. 2009-278036, 5 pages.

* cited by examiner

Fig. 5

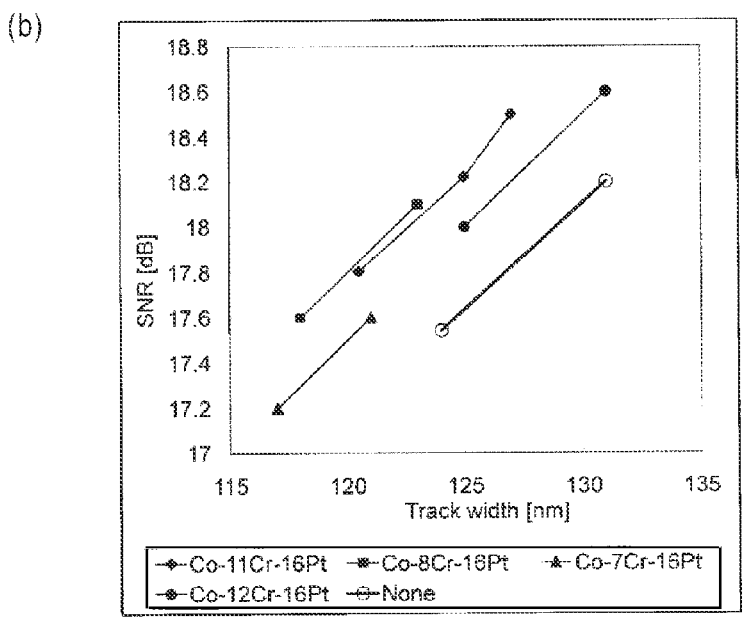

(a)

| | Granular main recording layer [nm] | Granular auxiliary recording layer | | Non-granular auxiliary recording layer [nm] | Track width [nm] | SNR [dB] | Evaluation |
|---|---|---|---|---|---|---|---|
| | | Composition of target | Film thickness [nm] | | | | |
| Example 2-1 | 10.3 | 90(Co-11Cr-16Pt)-5(SiO)-5(TiO) | 1.4 | 6.4 | 127 | 18.5 | Better |
| Example 2-2 | 10.3 | | 2.5 | 6.4 | 125 | 18.2 | Better |
| Example 2-3 | 10.3 | | 3.6 | 6.4 | 121 | 17.8 | Better |
| Example 2-4 | 10.3 | 90(Co-8Cr-16Pt)-5(SiO)-5(TiO) | 0.7 | 6.4 | 123 | 18.1 | Better |
| Example 2-5 | 10.3 | | 1.4 | 6.4 | 118 | 17.6 | Better |
| Example 2-6 | 10.3 | 90(Co-7Cr-16Pt)-5(SiO)-5(TiO) | 0.7 | 6.4 | 121 | 17.6 | good |
| Example 2-7 | 10.3 | | 1.4 | 6.4 | 117 | 17.2 | good |
| Example 2-8 | 10.3 | 90(Co-12Cr-16Pt)-5(SiO)-5(TiO) | 1.4 | 6.4 | 131 | 18.6 | good |
| Example 2-9 | 10.3 | | 2.5 | 6.4 | 125 | 18.0 | good |
| Comparative Example 2-1 | 10.3 | None | 0 | 6.4 | 131 | 18.2 | Poor |
| Comparative Example 2-2 | 11.7 | | 0 | 6.4 | 124 | 17.5 | Poor |

(b)

MAGNETIC DISK AND METHOD FOR MANUFACTURING SAME

TECHNICAL FIELD

The present invention relates to a magnetic disk having a carbon-based protective layer and mounted in a hard disk drive (HDD) of a perpendicular magnetic recording system or the like, and a method for manufacturing the same.

BACKGROUND ART

Characteristics required for a magnetic disk mounted in an HDD of a magnetic recording system or the like include, for example, a good SNR of a recorded signal, good thermal stability, and easiness to record. Among others, in order to improve a SNR, it is necessary to reduce the particle diameter of magnetic particles constituting a magnetic recording layer. However, if the particle diameter of magnetic particles is reduced, a signal becomes thermally unstable. In order to thermally stabilize a signal, it is necessary to increase perpendicular magnetic anisotropy energy (Ku), however, if perpendicular magnetic anisotropy energy is increased too much, it becomes impossible to record information on a magnetic head.

In order to solve such a problem, for example, a CGC (Continuous Granular Coupled) medium has been developed, which comprises a granular magnetic recording layer composed of granular columnar particles and non-magnetic regions between the granular columnar particles; and an auxiliary recording layer formed on the granular magnetic recording layer and causing exchange coupling among the granular columnar particles. In the CGC medium, static magnetic characteristics (SNR), recording characteristics, and thermal stability can be controlled by adjusting the exchange interaction between the auxiliary recording layer and the granular magnetic recording layer, and the exchange interaction among the granular columnar particles via the auxiliary recording layer.

PRIOR ART DOCUMENT

Patent Document

Patent Document 1: Japanese Unexamined Patent Application Publication No. 2008-84432

SUMMARY OF THE INVENTION

Problems to be Solved by the Invention

In a conventional magnetic disk of a perpendicular magnetic recording system, whose recording capacity is less than 250 G bits per square inch, noise can be more reduced when not only a granular magnetic recording layer but also an auxiliary recording layer is provided, as compared with when only a granular magnetic recording layer is provided. However, if the recording capacity is 250 G or more bits per square inch, noise is caused due to strong exchange interaction between magnetic particles in an auxiliary recording layer because the auxiliary recording layer is a continuous film.

One aspect of the present invention was made in view of the above-mentioned problem, and it is an object of the present invention to provide a magnetic disk comprising a granular magnetic recording layer, which causes less noise even with a recording capacity of 250 G or more bits per square inch, and a method for manufacturing the same.

Means for Solving the Problem

One aspect of a magnetic disk according to the present invention comprises: a granular magnetic recording layer which is formed on a disk substrate directly or via an intermediate layer and which has non-magnetic regions between granular columnar particles; and an auxiliary recording layer which is formed on the granular magnetic recording layer and which causes exchange coupling among the granular columnar particles, wherein the auxiliary recording layer contains 0.1 to 3 mol % of oxygen.

In this structure, the auxiliary recording layer containing 0.1 to 3 mol % of oxygen is provided on the magnetic recording layer, and uniformity of the grain boundary among the magnetic particles in the auxiliary recording layer can be thereby improved. As a result, uniformity in magnetic continuity also increases, and consequently noise can be reduced even in a magnetic disk comprising the magnetic recording layer, which has a granular structure and a recording capacity of 250 G or more bits per square inch.

In one aspect of the magnetic disk according to the present invention, the oxygen is preferably contained in the auxiliary recording layer in a state of oxide. Here, the oxide is preferably precipitated on the non-magnetic regions of the granular magnetic recording layer.

In one aspect of the magnetic disk according to the present invention, it is preferable that the granular magnetic recording layer contains oxygen, and that the amount of oxygen contained in the auxiliary recording layer is less than that in the granular magnetic recording layer.

In one aspect of the magnetic disk according to the present invention, the oxygen contained in the granular magnetic recording layer preferably has two or more kinds of oxides mixed therein.

In one aspect of the magnetic disk according to the present invention, a non-magnetic separation layer is preferably interposed between the granular magnetic recording layer and the auxiliary recording layer.

In one aspect of the magnetic disk according to the present invention, the granular magnetic recording layer is preferably composed of two or more layers.

In one aspect of the magnetic disk according to the present invention, the recording capacity is preferably 250 G or more bits per square inch.

Another aspect of a magnetic disk according to the present invention comprises, on a disk substrate, at least: a magnetic recording layer having a granular structure where non-magnetic grain boundary portions are formed between magnetic particles composed of CoCrPt and continuously grow in a columnar shape; and an auxiliary recording layer formed on the magnetic recording layer, wherein the auxiliary recording layer includes: a non-granular auxiliary recording layer which is a magnetic layer almost magnetically continuous in the in-plane direction of the main surface of the disk substrate; and a granular auxiliary recording layer which is provided below the non-granular auxiliary recording layer, has higher coercive force than the non-granular auxiliary recording layer, and has a granular structure.

In this structure, the granular auxiliary recording layer having higher coercive force acts as a pin layer of the non-granular auxiliary recording layer. Therefore, while more blurred writing are generally caused when a thicker auxiliary recording layer is used, a track width can be made narrower (blurred writing can be reduced) and SNR can be improved even if a thicker auxiliary recording layer is provided. Thus, compatibility between a track width and SNR can be achieved.

In another aspect of the magnetic disk according to the present invention, the granular auxiliary recording layer preferably has lower at % of Cr and higher at % of CoPt than the magnetic recording layer. The reason for this is that, in this composition, the granular auxiliary recording layer has higher coercive force than the magnetic recording layer, and ideally acts as a pin layer of the non-granular auxiliary recording layer.

In another aspect of the magnetic disk according to the present invention, the difference (A–B) between a Cr concentration (A) of the magnetic recording layer and a Cr concentration (B) of the granular auxiliary recording layer is preferably not less than 1 at % and not more than 4 at %. That is, compared to the magnetic recording layer, at % of Cr is made smaller and at % of CoPt is made larger to increase coercive force. In other words, in metal layers, the difference (A–B) in Cr concentration (B) is preferably not less than 1 at % and not more than 4 at %.

In another aspect of the magnetic disk according to the present invention, the granular auxiliary recording layer preferably has thinner film thickness than the non-granular auxiliary recording layer. The reason for this is that, if the non-granular auxiliary recording layer is made thinner, recording itself will be impossible, therefore the thickness of the non-granular auxiliary recording layer is maintained to keep OW characteristics, while a blurred writing is prevented by the granular auxiliary recording layer which acts as a pin layer of the non-granular auxiliary recording layer. It is preferable that the film thickness of the granular auxiliary recording layer is 0.5 to 5.0 nm, and that of the non-granular auxiliary recording layer 4.0 to 8.0 nm.

A method for manufacturing a magnetic disk according to the present invention comprises: a magnetic recording layer formation step of forming at least a granular magnetic recording layer on a disk substrate; and an auxiliary recording layer formation step of forming an auxiliary recording layer on the magnetic recording layer, wherein the auxiliary recording layer containing 0.1 to 3 mol % oxygen is formed in the auxiliary recording layer formation step.

In the method for manufacturing the magnetic disk according to the present invention, the auxiliary recording layer is preferably formed by sputtering with use of a sputtering target containing oxide in the auxiliary recording layer formation step.

In the method for manufacturing the magnetic disk according to the present invention, the auxiliary recording layer is preferably formed by reactive sputtering where oxygen is incorporated at a partial pressure of 0.5 to 3% in the auxiliary recording layer formation step.

In the method for manufacturing the magnetic disk according to the present invention, it is preferable that a non-magnetic separation layer is interposed between the granular magnetic recording layer and the auxiliary recording layer so as to control the strength of ferromagnetic coupling between the granular magnetic recording layer and the auxiliary recording layer.

In the method for manufacturing the magnetic disk according to the present invention, the granular magnetic recording layer is preferably formed of two or more layers.

Effect of the Invention

The magnetic disk according to the present invention comprises: a granular magnetic recording layer which is formed on a disk substrate directly or via an intermediate layer and which has non-magnetic regions between granular columnar particles; and an auxiliary recording layer which is formed on the granular magnetic recording layer and which causes exchange coupling among the granular columnar particles, wherein the auxiliary recording layer contains 0.1 to 3 mol % of oxygen, and thereby, less noise is caused even with the recording capacity of 250 G or more bits per square inch.

Moreover, according to the present invention, a perpendicular magnetic recording medium can be provided which can improve recording density by achieving compatibility between a track width and SNR, namely by maintaining the film thickness of the auxiliary recording layer to keep OW characteristics in a good state while narrowing a track width and improving SNR.

BRIEF DESCRIPTION OF THE DRAWINGS

FIG. 5 shows comparisons of track widths and SNRs between examples where a granular auxiliary recording layer and a non-granular auxiliary recording layer of a varied film thickness are included and comparative examples where only a non-granular auxiliary recording layer is included.

BEST MODES FOR CARRYING OUT THE INVENTION

Figure 1:
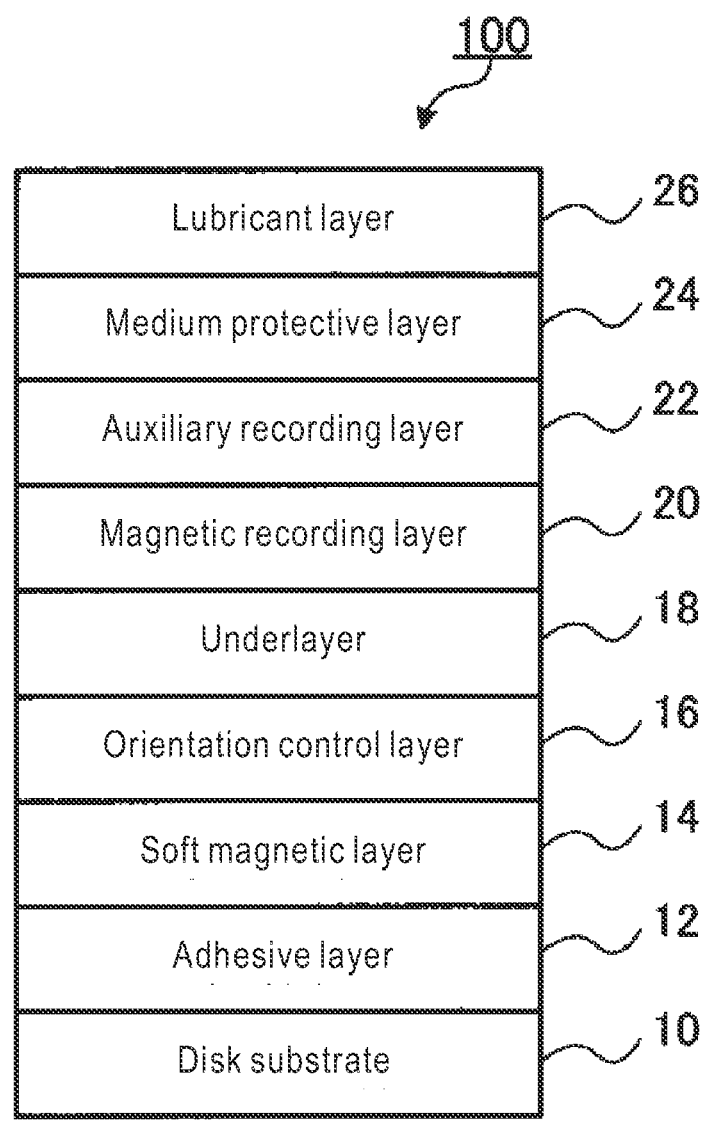
FIG. 1 shows a schematic configuration of a magnetic disk according to Embodiment 1 of the present invention.

Preferred embodiments of the present invention will be described in details with reference to the accompanying drawings. The dimensions, materials, and others such as specific numerical values mentioned in these embodiments are merely illustrated to facilitate understanding of the invention, and are not meant to limit the present invention unless otherwise specified. Note that, in the specification and the drawings, components having substantially the same functions and structures are assigned the same reference characters to omit redundant descriptions, and that components not directly relating to the present invention are not shown in the drawings.

Embodiment 1

FIG. 1 shows a schematic configuration of a magnetic disk according to Embodiment 1 of the present invention. A medium of a perpendicular magnetic recording system (a perpendicular magnetic recording medium) 100 shown in FIG. 1 is configured by sequentially laminating a disk substrate 10, an adhesive layer 12, a soft magnetic layer 14, an orientation control layer 16, an underlayer 18, a magnetic recording layer 20, an auxiliary recording layer 22, a medium protective layer 24, and a lubricant layer 26.

For example, a glass substrate, an aluminum substrate, a silicon substrate, or a plastic substrate can be used as the disk substrate (a substrate for a magnetic disk) 10. If a chemically strengthened glass substrate with a smooth surface is used as a substrate 1, the substrate can be manufactured by a manufacturing process including for example: a material processing step and a first lapping step; an end forming step (a coring step of forming a hole, a chamfering step (a chamfered surface forming step) of forming a chamfered surface on an end (an outer peripheral end and/or an inner peripheral end)); an end polishing step (for an outer peripheral end and an inner peripheral end); a second lapping step; a main surface polishing step (first and second polishing steps); and a chemically strengthening step.

The adhesive layer 12 can improve adhesion between the disk substrate 10 and the soft magnetic layer 14, thereby preventing peeling of the soft magnetic layer 14. For example, a CrTi alloy can be used as a material of the adhesive layer 12.

The soft magnetic layer 14 is a layer which causes a magnetic field generated from a main magnetic pole of a magnetic recording head to pass through. Examples of a material constituting the soft magnetic layer 14 include, for example, a CoFeTaZr alloy. In addition, the soft magnetic layer 14 may be configured so that a non-magnetic spacer layer is interposed between a first soft magnetic layer and a second soft magnetic layer to cause AFC (Antiferromagnetic exchange coupling). Thereby, the magnetizing direction of the soft magnetic layer 14 can be aligned along a magnetic path (magnetic circuit) with high accuracy, and the perpendicular components of the magnetizing direction can be extremely reduced, so that less noise can be caused from the soft magnetic layer 14. Here, for example, Ru (ruthenium) can be used as a material of the spacer layer.

The orientation control layer 16 has effects of protecting the soft magnetic layer 14 and of promoting the alignment of the orientation of crystal grains in the underlayer 18. A material of the orientation control layer can be selected from Ni, Cu, Pt, Pd, Zr, Hf, and Nb. Further, the material may be an alloy based on any of the metals and including any one or more of additional elements of Ti, V, Ta, Cr, Mo, and W. For example, NiW, NiCr, a NiTa alloy, a CuW alloy, and a CuCr alloy can be selected suitably. Moreover, the orientation control layer may be formed of two or more layers.

The underlayer 18 has an hcp structure and enables crystals of an hcp structure in the magnetic recording layer 20 to grow into those of a granular structure (of a structure having non-magnetic regions between granular columnar particles). Therefore, as the crystal orientation of the underlayer 18 is higher, the orientation of the magnetic recording layer 20 can be improved. In addition, in order to give separativeness, the underlayer 18 may be formed of a lower layer to which a lower Ar pressure is applied at the time of deposition and an upper layer to which a higher Ar pressure is applied thereat. In addition to Ru, a material of the underlayer can be selected from Re, Pt, a RuCr alloy, a RuCo alloy and the like. Ru has an hcp structure and can satisfactorily orient the Co-based magnetic recording layer. Any oxide may be also added.

The magnetic recording layer 20 is formed on a disk substrate 10 directly or via an intermediate layer. In the magnetic recording layer 20, two or more kinds of oxides (hereinafter referred to as "composite oxides") are contained, thereby causing the composite oxides to be precipitated in a non-magnetic grain boundary. Namely, Cr and the composite oxides, which are non-magnetic substances, (non-magnetic region 20a) in the magnetic recording layer 20 are precipitated around Co, which is a magnetic substance, to form the grain boundary, thereby magnetic particles (magnetic grains) 20b growing in a granular structure of a columnar shape (granular magnetic recording layer).

Here, examples of a material constituting the granular magnetic recording layer include, for example, CoCrPt—SiO$_2$ (hcp crystal structure), CoCrPt—TiO$_2$ (hcp crystal structure). Also, the thickness of the magnetic recording layer 20 is preferably 5 to 15 nm.

Moreover, the magnetic recording layer 20 may be formed by laminating two or more thin films. For example, the magnetic recording layer can be formed of two or more layers (lamination film) by depositing any of the above-mentioned materials in multiple times. Thereby, magnetic particles can be prevented from being enlarged as magnetic particles are deposited, and the particle diameters from the lower layer to the upper layer can be made uniform. Note that the same material or different materials may be used as a film to be laminated.

The auxiliary recording layer 22 is formed above the granular magnetic layer, and causes exchange coupling among the granular columnar particles in the granular magnetic layer. The auxiliary recording layer 22 is preferably a thin film (continuous layer) which has high perpendicular magnetic anisotropy and shows high saturation magnetization Ms, and has magnetic continuity in the in-plane direction of the disk substrate. The auxiliary recording layer 22 is intended to improve the reverse magnetic domain nucleus forming magnetic field Hn, thermal fluctuation resistance, and overwrite characteristics. Examples of a material of the auxiliary recording layer 22 include CoCrPtB—CuO, CoCrPtB—CoO, CoCrPtB—Co$_2$O$_4$, CoCrPtB—Cr$_2$O$_3$, CoCrPtB—SiO$_2$, and CoCrPtB—TiO$_2$, as well as other those obtained by adding various oxides to alloys other than CoCrPtB, such as CoPt, CoCrPt, CoCrPtTa, CoCrPtCu, and CoCrPtBCu. Furthermore, the auxiliary recording layer can be formed by reactive sputtering where oxygen is added at a suitable partial pressure at the time of sputtering the alloys.

Furthermore, the auxiliary recording layer 22 contains 0.1 to 3 mol % of oxygen. It is preferable that the amount of oxygen contained in the auxiliary recording layer 22 is less than that in the granular magnetic recording layer 20. With the amounts set up in this way, the auxiliary recording layer 22 can be prevented from being magnetically separated, thereby maintaining an effect as an auxiliary recording layer (effect of making exchange coupling between granular columnar particles). Note that the amount of "oxygen" is calculated in terms of oxygen molecules (O$_2$). For example, 2 mol % of CuO contain 1 mol of oxygen molecules, and 2 mol % of SiO$_2$ 2 mol of oxygen molecules.

Figure 2:
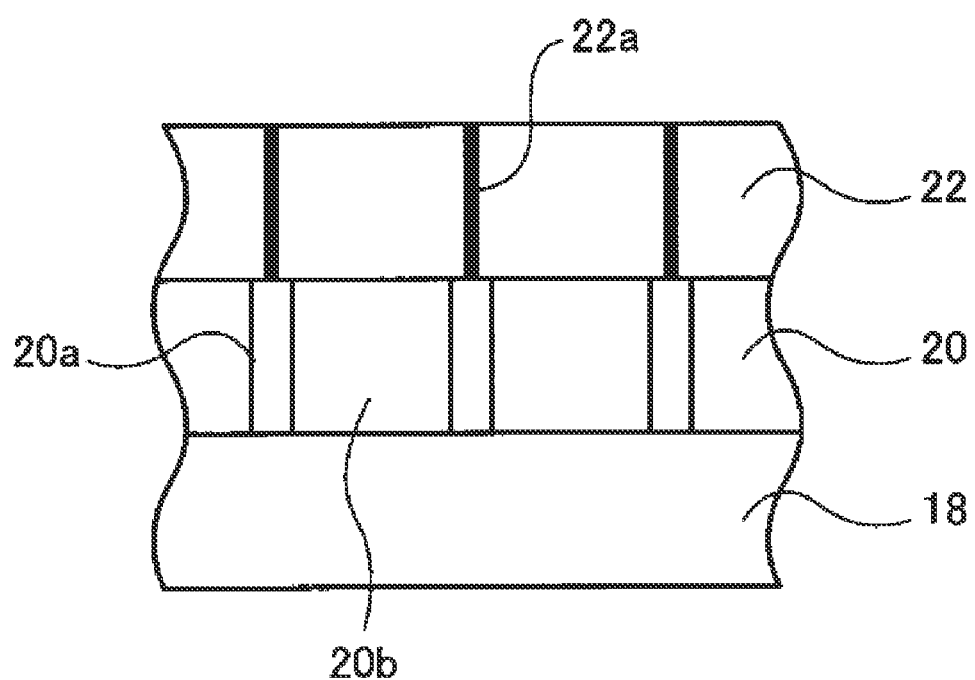
FIG. 2 illustrates an auxiliary recording layer of the magnetic disk shown in FIG. 1.

In the auxiliary recording layer 22, as shown in FIG. 2, oxygen precipitates in a state of oxide, or as a compound obtained by combining oxygen with other atoms. The precipitate 22a is deposited on the non-magnetic region 20a of the magnetic recording layer 20. When the auxiliary recording layer 22 is formed by sputtering with use of a sputtering target containing an oxide, oxygen precipitates in a state of oxide. Meanwhile, when the auxiliary recording layer 22 is formed by reactive sputtering where oxygen is incorporated at a partial pressure of 0.5 to 3%, oxygen precipitates as a compound obtained by combining with atoms such as Co or Cr. The thickness of the auxiliary recording layer 22 is preferably 5 to 10 nm. In addition, the auxiliary recording layer 22 may be formed of two or more films.

With 0.1 to 3 mol % of oxygen positively contained in the auxiliary recording layer 22 in this way, structural non-uniformity caused in the course of laminating the auxiliary recording layer can be reduced, and accordingly noise from the auxiliary recording layer resulting from the non-uniformity can be reduced. Furthermore, as a result of the improvement in the characteristics of the auxiliary recording layer, the exchange coupling among the granular columnar particles in the magnetic recording layer 20 can be controlled more easily. Thereby, general noises from the magnetic recording layer 20 to the auxiliary recording layer 22 can be reduced. This effect is remarkable especially in a disk with the recording capacity of 250 G or more bits per square inch.

The medium protective layer 24 is formed by depositing carbon by a CVD method while maintaining a vacuum. The medium protective layer 24 is a protective layer for protecting the perpendicular magnetic recording layer against impacts from a magnetic recording head. In general, as compared with carbon deposited by a sputtering method, carbon deposited by a CVD method has higher film hardness, and thereby can more effectively protect the perpendicular magnetic recording layer against impacts from the magnetic recording head. The thickness of the medium protective layer 24 is preferably 2 to 5 nm.

The lubricant layer 26 is formed by depositing PFPE (perfluoropolyether) by a dip-coating method. Here, the thickness of the lubricant layer 26 is approximately 1 nm.

In the perpendicular magnetic recording medium 100 shown in FIG. 1, a separation layer which is a non-magnetic layer may be interposed between the magnetic recording layer 20 and the auxiliary recording layer 22. With the separation layer interposed, the strength of ferromagnetic exchange coupling between the magnetic recording layer 20 and the auxiliary recording layer 22 can be controlled. As a result, the strength of magnetic coupling between the columnar magnetic particles present in the magnetic recording layer 20 can be also controlled, thereby further improving the medium characteristics. The separation layer can be formed of thin films of Ruthenium (Ru) or a Ru alloy or compound obtained by adding Cr, Co, oxygen or oxide to Ru.

In the manufacturing of the magnetic disk having the above-mentioned configuration, amorphous aluminosilicate glass is first molded in a disk shape by direct-pressing to make a glass disk. Then, the glass disk is sequentially ground, polished, and chemically strengthened to obtain a smooth non-magnetic disk substrate 10 composed of the chemically strengthened glass disk.

On the resultant disk substrate 10, films from the adhesive layer 12 to the auxiliary recording layer 22 are sequentially deposited in an Ar atmosphere by DC magnetron sputtering with use of a vacuumed film forming device, and the medium protective layer 24 is deposited by a CVD method. Then, the lubricant layer 26 is formed by a dip-coating method.

In the deposition of the auxiliary recording layer 22, 0.1 to 3 mol % of oxygen is made contained. For example, the auxiliary recording layer 22 is formed by sputtering with use of a sputtering target containing oxide, or by reactive sputtering where oxygen is incorporated at a partial pressure of 0.5 to 3%.

Thus, the magnetic disk according to the present invention is provided with the auxiliary recording layer containing 0.1 to 3 mol % of oxygen on the magnetic recording layer, thereby improving uniformity of the grain boundary among magnetic particles in the auxiliary recording layer. As a result, uniformity in magnetic continuity is also improved, and consequently noise can be reduced even in a magnetic disk comprising the magnetic recording layer, which has a granular structure and a recording capacity of 250 G or more bits per square inch.

Embodiment 2

In Embodiment 2, a magnetic disk configuration different from that according to Embodiment 1 will be described.

In general, important for improving a recording density in a magnetic disk are improvements in static magnetic characteristics such as the coercive force Hc and reverse magnetic domain nucleus forming magnetic field Hn mentioned above, and in electromagnetic conversion characteristics such as overwrite characteristics (OW characteristics), SNR (Signal Noise Ratio), and narrowing of track width. In particular, the auxiliary recording layer may be disposed above or below the magnetic recording layer in order to improve OW characteristics. The auxiliary recording layer is a magnetic layer almost magnetically continuous in the in-plane direction on the main surface of the disk substrate, and improves the OW characteristics by exerting a magnetic interaction on the magnetic recording layer to raise the reverse magnetic domain nucleus forming magnetic field Hn.

However, with the auxiliary recording layer disposed, so-called "blurred writing" is caused and the track width is increased in exchange for the improvement in the OW characteristics. Moreover, the blurred writing has an influence on adjacent recording bits and tracks, deteriorating the signal quality of the adjacent tracks. In other words, the auxiliary recording layer is originally intended to improve a surface recording density by lowering coercive force Hc and improving SNR to improve a linear recording density, but the influence of the existence of the auxiliary recording layer on the adjacent tracks reduces track density and accordingly lowers surface recording density. On the other hand, if the thickness of the auxiliary recording layer is made thinner in order to avoid the blurred writing, then recording itself will be difficult (due to poorer OW characteristics), and more noise will be caused.

Therefore, it is necessary to deposit the auxiliary recording layer with a suitable film thickness. However, the behavior of the auxiliary recording layer is very sensitive to its film thickness: namely, if there is any difference in film thickness from an ideal value, blurred writing will increase or the OW characteristics will deteriorate. Thus, in the auxiliary recording layer, the blurred writing and the OW characteristic are in a trade-off relation, and are difficult to stably balance as desired.

An object of Embodiment 2 is to provide a magnetic disk which can improve recording density by achieving compatibility between a track width and SNR, namely by maintaining the film thickness of the auxiliary recording layer to keep OW characteristics in a good state while narrowing a track width and improving SNR.

In order to solve the above-mentioned problems, the inventor earnestly considered and conceived that the auxiliary recording layer is formed so as to have a two-layer structure, in which one layer at a closer side to the magnetic recording layer has a granular structure and acts as a pin layer (magnetization direction fixing layer) for another layer at a far side. The structure is described below with reference to the drawings.

[Perpendicular Magnetic Recording Medium]

Figure 3:
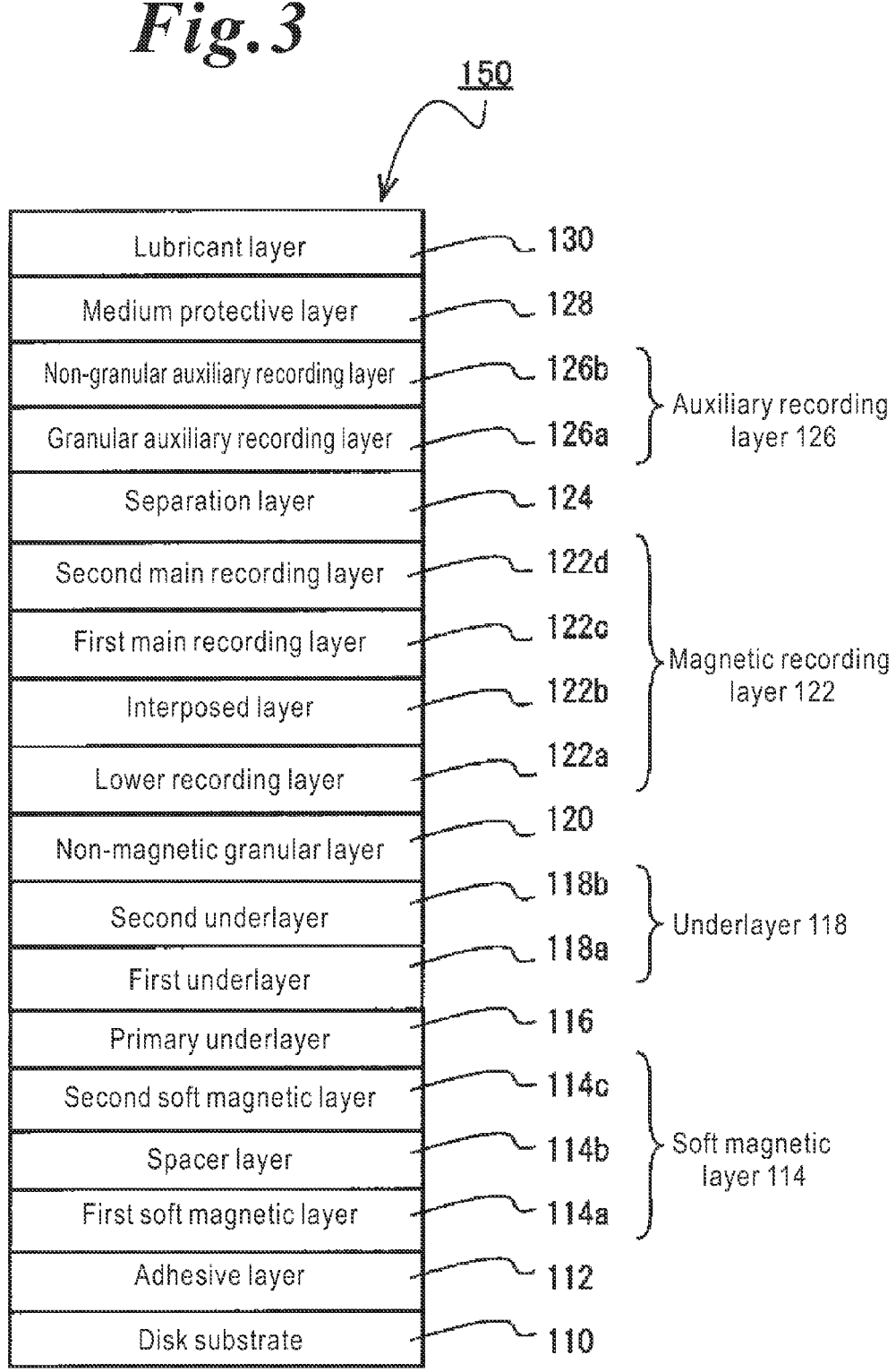
FIG. 3 illustrates a configuration of a perpendicular magnetic recording medium according to Embodiment 2 of the present invention.

FIG. 3 illustrates the configuration of a perpendicular magnetic recording medium 150 according to Embodiment 2. The perpendicular magnetic recording medium 150 shown in FIG. 3 is composed of a disk substrate 110, an adhesion layer (adhesive layer) 112, a first soft magnetic layer 114a, a spacer layer 114b, a second soft magnetic layer 114c, a primary underlayer 116 (non-magnetic layer), a first underlayer 118a, a second underlayer 118b, a non-magnetic granular layer 120, a lower recording layer 122a, an interposed layer 122b, a first main recording layer 122c, a second main recording layer 122d, a separation layer 124, a granular auxiliary recording layer 126a, a non-granular auxiliary recording layer 126b, a medium protective layer 128, and a lubricant layer 130. The first soft magnetic layer 114a, the spacer layer 114b, and the second soft magnetic layer 114c together constitutes a soft magnetic layer 114. The first underlayer 118a and the second underlayer 118b together constitutes an underlayer 118. The lower recording layer 122a, the interposed layer 122b, the first main recording layer 122c, and the second main recording layer 122d together constitutes a magnetic recording layer 122. The granular auxiliary recording layer 126a and the non-granular auxiliary recording layer 126b together constitutes an auxiliary recording layer 126.

As the disk substrate 110, a glass disk can be used which is obtained by molding amorphous aluminosilicate glass in a disk shape by direct-pressing. Note that there is no particular restriction on the type, size, thickness, and others of the glass disk. Examples of a material of the glass disk include, for example, aluminosilicate glass, soda lime glass, soda aluminosilicate glass, aluminoborosilicate glass, borosilicate glass, quartz glass, chain silicate glass, or glass ceramic such as crystallized glass. The glass disk is sequentially ground, polished, and chemically strengthened to obtain a smooth non-magnetic disk substrate 110 composed of chemically strengthened glass disk.

On the substrate 110, films from the adhesion layer 112 to the auxiliary recording layer 126 are sequentially deposited by a DC magnetron sputtering method, and the medium protective layer 128 can be deposited by a CVD method. Then, the lubricant layer 130 can be deposited by a dip coating method. Note that it is also preferable to use an in-line deposition method because of its high productivity. The structure of individual layers will be described below.

The adhesion layer 112 is formed in contact with the disk substrate 110, and has functions of increasing peel strength between the soft magnetic layer 130 and the disk substrate 110 formed thereon, and of fining and uniforming crystal grains of each layer deposited on the soft magnetic layer 114. If the disk substrate 110 is composed of amorphous glass, the adhesive layer 112 is preferably an amorphous (non-crystalline) alloy film so as to be compatible with the amorphous glass surface.

The adhesion layer 112 can be selected from, for example, a CrTi-based amorphous layer, a CoW-based amorphous layer, a CrW-based amorphous layer, a CrTa-based amorphous layer, or a CrNb-based amorphous layer. The adhesion layer 112 may be a single layer composed of a single material, or may be formed by laminating two or more layers. For example, a CoW or CrW layer may be formed on a CrTi layer. Moreover, these adhesive layers 112 are preferably made by sputtering with use of a material containing carbon dioxide, carbon monoxide, nitrogen or oxygen, or by exposing the surface layer to these gases.

The soft magnetic layer 114 is a layer for forming a magnetic path temporarily at the time of recording in order to allow a magnetic flux to pass through the record layer perpendicularly in a perpendicular magnetic recording system. The soft magnetic layer 114 may be configured so that the non-magnetic spacer layer 114b is interposed between the first soft magnetic layer 114a and the second soft magnetic layer 114c to cause AFC (Antiferromagnetic exchange coupling). Thereby, the magnetizing direction of the soft magnetic layer 114 can be aligned along the magnetic path (magnetic circuit) with high accuracy, and the perpendicular components of the magnetizing direction can be extremely reduced, so that less noise can be caused from the soft magnetic layer 114. For example, a cobalt-based alloy such as CoTaZr, a Co—Fe-based alloy such as CoCrFeB or CoFeTaZr, or a Ni—Fe-based alloy such as a [Ni—Fe/Sn]$_n$ multilayer structure can be used to compose the first soft magnetic layer 114a and the second soft magnetic layer 114c.

The primary underlayer (orientation control layer) 116 is a non-magnetic layer, or namely a non-magnetic alloy layer, and has effects of protecting the soft magnetic layer 114 and of promoting the alignment of the orientation of crystal grains in the underlayer 118. A material of the primary underlayer 116 can be specifically selected from Ni, Cu, Pt, Pd, Zr, Ta, Hf, and Nb. Further, the material may be an alloy based on any of the metals and including any one or more of additional elements of Ti, V, Ta, Cr, Mo, and W. For example, NiW, NiCr, a NiTa alloy, a CuW alloy, and a CuCr alloy can be selected suitably. Moreover, the primary underlayer layer may be formed of two or more layers.

This improves the roughness of each boundary surface between two or more layers formed on the soft magnetic layer 114, and thereby improves the crystal orientation of these layers. Therefore, SNR and recording density can be improved.

The underlayer 118 has an hcp structure and an effect of growing Co crystals of an hcp structure in the magnetic recording layer 122 into those of a granular structure. Therefore, as the crystal orientation of the underlayer 118 is higher, namely as the crystal (0001) surface of the underlayer 118 is more parallel to the main surface of the disk substrate 110, the orientation of the magnetic recording layer 122 can be improved. In addition, in order to give separativeness, the underlayer 118 may be formed of a lower layer to which a lower Ar pressure is applied at the time of deposition and an upper layer to which a higher Ar pressure is applied thereat. A material of the underlayer 118 is typically Ru, but can be also selected from Re, Pt, RuCr, or RuCo. Ru has an hcp structure and a similar crystal interatomic distance to that of Co, and can therefore satisfactorily orient the Co-based magnetic recording layer 122. Any oxide may be also added.

If the underlayer 118 is made of Ru, the underlayer can be formed of two layers composed of Ru by changing a gas pressure at the time of sputtering. Specifically, when the first underlayer 118a at a lower layer side is formed, Ar gas pressure is made the specified pressure, namely a lower pressure, while when the second underlayer 118b at a upper layer side is formed, Ar gas pressure is made higher than that when the first underlayer 118a at a lower layer side is formed, namely a higher pressure. Thereby, the crystal orientation of the magnetic recording layer 122 can be improved by the first underlayer 118a, and the grain diameter of the magnetic particles in the magnetic recording layer 122 can be decreased by the second underlayer 118b.

Moreover, when the gas pressure is made higher, the mean free path of plasma ions to be sputtered becomes shorter, and accordingly the depositing speed becomes slower and a film rougher. As a result, separation and micronization of the crystal grains of Ru can be promoted, and the crystal grains of Co can be micronized.

Furthermore, minute amounts of oxygen may be incorporated into Ru of the underlayer 118. Thereby, separation and micronization of the crystal grains of Ru can be further promoted, and the magnetic recording layer 122 can be further isolated and micronized. Therefore, according to Embodiment 2, oxygen is incorporated into the second underlayer, which is one of two layers constituting the underlayer 118 and deposited just below the magnetic recording layer. In other words, the second underlayer is composed of RuO, so that the above-mentioned advantages can be acquired the most effectively. Note that, although oxygen may be incorporated by reactive sputtering, a target containing oxygen is preferably used at the time of sputtering deposition.

The non-magnetic granular layer 120 is a non-magnetic layer having a granular structure. By forming the non-magnetic granular layer 120 on the hcp crystal structure of the underlayer 118 and growing the granular layer of the lower recording layer 122a (namely, the whole of the magnetic recording layer 122) thereon, the magnetic granular layer can be separated from the stage of initial growth (initial rise). Thereby, isolation of magnetic particles in the magnetic recording layer 122 can be promoted. The non-magnetic granular layer 120 can be composed to have a granular structure, by precipitating non-magnetic substances among non-magnetic crystal grains composed of a Co-based alloy to form a grain boundary.

According to Embodiment 2, CoCr—$SiO_2$ is used for such a non-magnetic granular layer 120. Thereby, $SiO_2$ (non-magnetic substance) precipitates between Co-based alloys (non-magnetic crystal grains) to form a grain boundary, so that the non-magnetic granular layer 120 can have a granular structure. Note that CoCr—$SiO_2$ is merely an example and is not intended to be limiting. Besides, CoCrRu—$SiO_2$ can be suitably used, and furthermore, Rh (rhodium), Pd (palladium), Ag (silver), Os (osmium), Ir (iridium), and Au (gold) can be also used instead of Ru. Note that a non-magnetic substance means a substance which can form a grain boundary portion (grain boundary region) around magnetic particles so as to suppress or block exchange interaction between the magnetic particles (magnetic grains), and also means a non-magnetic substance which does not form a solid solution with cobalt (Co). For example, silicon oxide (SiOx), chromium (Cr), chromium oxide ($Cr_2O_3$), titanium oxide ($TiO_2$), zirconium oxide ($ZrO_2$), and tantalum oxide ($Ta_2O_5$) can be mentioned.

Note that Embodiment 2 has a configuration with the non-magnetic granular layer 120 formed on the underlayer 118 (the second underlayer 118b), but is not intended to limit to the configuration, and that the perpendicular magnetic recording medium 100 may be also configured without forming the non-magnetic granular layer 120.

The magnetic recording layer 122 has a columnar granular structure which is formed by precipitating a non-magnetic substance around the magnetic particles in a hard-magnetic material selected from a Co-based alloy, a Fe-based alloy, and a Ni-based alloy to form the grain boundary (granular magnetic recording layer). By providing the non-magnetic granular layer 120, these magnetic particles can epitaxially grow continuously from the granular structure thereof. According to Embodiment 2, the magnetic recording layer 122 is composed of the lower recording layer 122a, the interposed layer 122b, the first main recording layer 122C, and the second main recording layer 122d. Thereby, small crystal grains in the first main recording layer 122c and the second main recording layer 122d grow continuously from the crystal particles (magnetic particles) in the lower recording layer 122a, so that the main recording layer can be micronized and SNR can be improved.

According to Embodiment 2, CoCrPt—$Cr_2O_5$—$SiO_2$ is used for the lower recording layer 122a. CoCrPt—$Cr_2O_5$—$SiO_2$ forms a granular structure where $Cr_2O_5$ and $SiO_2$ (oxides), which are non-magnetic substances, precipitate around the magnetic particles (grains) composed of CoCrPt to form a grain boundary, and where the magnetic particles grow in a columnar shape. The magnetic particles epitaxially grew continuously from the granular structure of the non-magnetic granular layer 120.

The interposed layer 122b is a non-magnetic thin film, and is interposed between the lower recording layer 122a and the first main recording layer 122c to separate the magnetic continuity therebetween. Here, with the thickness of the interposed layer 122b being made the specified thickness (0.2 to 0.9 nm), antiferromagnetic exchange coupling (AFC) may occur between the lower recording layer 122a and the first main recording layer 122c. Thereby, the layers at the upper and lower sides of the interposed layer 122b attract each other due to magnetization and act to mutually fix their magnetization directions, so that fluctuation of a magnetization axis can be reduced, and less noise can be caused.

The interposed layer 122b is preferably composed of Ru or a Ru compound. The reason for this is that Ru has a similar interatomic distance to that of Co constituting magnetic particles, and therefore hardly impedes epitaxial growth of the crystal grains of Co even if interposed into the magnetic recording layer 122. Moreover, the epitaxial growth is hardly impeded because of extremely thin thickness of the interposed layer 122b.

Here, without the interposed layer 122b, the lower recording layer 122a would be a magnet which is continuous with the first main recording layer 122c and the second main recording layer 122d. However, since divided by the interposed layer 122b, each of those layers becomes an individual short magnet. Further, by making the thickness of the lower recording layer 122a thinner, the aspect ratio of granular magnetic particles shrinks (in the perpendicular magnetic recording medium, the film thickness direction is equal to the longitudinal direction of a easy magnetization axis), thereby strengthening a demagnetizing field which generates inside the magnet. Therefore, although having hard magnetism, the lower recording layer 122a emits a smaller magnetic moment outside, and is hardly captured by a magnetic recording head. In other words, a magnetic recording layer with high coercive force and less noise can be obtained by adjusting the thickness of the lower recording layer 122a to set a magnetic moment (magnetic strength) to such a degree that a magnetic flux hardly reaches a magnetic recording head and that a magnetic interaction can be given to the first main recording layer 122c.

According to Embodiment 2, CoCrPt—$SiO_2$—$TiO_2$ is used for the first main recording layer 122c. Thereby, the first main recording layer 122c also formed a granular structure where $SiO_2$ and $TiO_2$ (composite oxides), which are non-magnetic substances, precipitate around the magnetic particles (grains) composed of CoCrPt to form a grain boundary, and where the magnetic particles grow in a columnar shape.

Moreover, according to Embodiment 2, although the second main recording layer 122d is continuous with the first main recording layer 122c, their compositions and film thickness are different. CoCrPt—$SiO_2$—$TiO_2$—$CO_2O_4$ is used for the second main recording layer 122d. Thereby, the second main recording layer 122d also formed a granular structure where $SiO_2$, $TiO_2$, and $CO_2O_4$ (composite oxides), which are non-magnetic substances, precipitate around the magnetic particles (grains) composed of CoCrPt to form a grain boundary, and where the magnetic particles grow in a columnar shape.

As described above, according to Embodiment 2, the second main recording layer 122d is configured to contain more oxides than the first main recording layer 122c, so that separation of crystal grains can be promoted in stages from the first main recording layer 122c to the second main recording layer 122d.

Moreover, the second main recording layer 122d is made to contain Co oxides as described above. If an oxide such as $SiO_2$ or $TiO_2$ is incorporated, oxygen will be depleted, and a Si or Ti ion will be mixed into magnetic particles, thereby disturbing crystal orientation and decreasing the coercive force Hc. Therefore, when a Co oxide is incorporated, the Co oxide can act as an oxygen carrier for making up for such oxygen depletion. As the Co oxide, $CO_3O_4$ is mentioned, but CoO may be used.

Co oxide has larger Gibss free energy ΔG (delta G) than $SiO_2$ and $TiO_2$, and facilitates separation between Co ions and oxygen ions. Therefore, oxygen preferentially separates from Co oxide, and compensates oxygen depletion caused in $SiO_2$ or $TiO_2$ to make Si or Ti ions into oxides and precipitate the oxides on a grain boundary. This prevents foreign particles such as Si and Ti from being mixing into magnetic particles and disturbing the crystallinity of the magnetic particles. Any surplus Co ions could be contained in the magnetic particles, but would not impair magnetic characteristics because magnetic particles themselves are Co alloys. Consequently, the crystallinity and crystal orientation of the magnetic particles can be improved, and coercive force Hc can be increased. Moreover, there is another advantage that the overwrite characteristics are also improved because the saturation magnetization Ms is improved.

However, there is a problem that SNR decreases when Co oxide is mixed in the magnetic recording layer. Therefore, by providing the first main recording layer 122c containing no Co oxide as described above, high SNR can be secured in the first main recording layer 122c, while higher coercive force Hc and over write characteristics can be obtained in the second main recording layer 122d. Note that the film thickness of the second main recording layer 122d is preferably thicker than that of the first main recording layer 122c, and, as a suitable example, the film thickness of the first main recording layer 122c can be 4 nm while that of the second main recording layer 122d can be 6 nm.

Note that the substances used for the lower recording layer 122a, the first main recording layer 122c, and the second main recording layer 122d are merely examples, and are not intended to be limiting. Examples of a non-magnetic substance for forming a grain boundary include, for example, oxides such as silicon oxide (SiOx), chromium (Cr), chrome oxide (CrxOy), titanium oxide ($TiO_2$), zirconium oxide ($ZrO_2$), tantalum oxide ($Ta_2O_5$), iron oxide ($Fe_2O_3$), and boron oxide ($B_2O_3$). Moreover, nitride such as BN and carbide such as $B_4C_3$ can be also suitably used.

Furthermore, according to Embodiment 2, two types of non-magnetic substances (oxides) are used for the lower recording layer 122a and the first main recording layer 122c while three types of those for the second main recording layer 122d, but they are not intended to be limiting. For example, one type of non-magnetic substance or a combination of two or more types of non-magnetic substances may be used for any or all of the layers from the lower recording layer 122a to the second main recording layer 122d. Although the type of non-magnetic substances contained therein is not limited, especially $SiO_2$ and $TiO_2$ are preferably incorporated as described in Embodiment 2. Therefore, unlike Embodiment 2, if only one layer constitutes the magnetic recording layer from the lower recording layer 122a to the second main recording layer 122d (if the interposed layer 122b is not provided), the magnetic recording layer preferably comprises CoCrPt—$SiO_2$—$TiO_2$.

The separation layer 124 is a non-magnetic layer interposed between the magnetic recording layer 122 (the second main recording layer 122d) and the auxiliary recording layer 126. By providing the separation layer, the strength of ferromagnetic exchange coupling between the magnetic recording layer and the auxiliary recording layer can be controlled. The film thickness of the separation layer is preferably within the range of 0.1 to 1.0 nm.

Moreover, according to Embodiment 2, the separation layer 124 can be composed of a thin film containing Ru, a Ru compound, Ru and oxygen, or Ru and an oxide. This also reduces noise resulting from the auxiliary recording layer 126. The reason for this is considered that, when the separation layer 124 is deposited, oxygen contained in the separation layer 124 precipitates on the oxides in the magnetic recording layer 122 and Ru precipitates on the magnetic particles, so that the crystal structure of Co in the magnetic recording layer 122 can be succeeded to Co of the auxiliary recording layer 126.

Various materials can be used as oxides to be incorporated into Ru of the separation layer 124, but especially alloys and oxides of W, Ti and Ru can be used to improve the electromagnetic conversion characteristic (SNR). For example, the separation layer 124 may be made of RuCr, RuCo, RuO, $RuWO_3$, or $RuTiO_2$, or any material obtained by incorporating an oxide into RuCr or RuCo. Especially, RuCr, RuCo, and $WO_3$ can have a higher effect.

As for $RuWo_3$, the oxygen incorporated into Ru dissociates during sputtering, and the dissociated oxygen also shows the effect by oxygenation. In other words, $RuWo_3$ is preferable for that reason that the use of $Wo_3$ can provide both effects by oxygenation and oxide addition. Another reason may be because of higher material affinity at the time of laminating since oxides are incorporated in the layers above and below the separation layer according to Embodiment 2. Other examples of oxides include oxides such as silicon oxide (SiOx), chromium (Cr), chrome oxide (CrxOy), titanium oxide ($TiO_2$), zirconium oxide ($ZrO_2$), tantalum oxide ($Ta_2O_5$), iron oxide ($Fe_2O_3$), and boron oxide ($B_2O_3$). Moreover, nitride such as BN and carbide such as $B_4C_3$ can be also suitably used. Note that RuCr and RuCo is considered to show excellent characteristics because of higher affinity since Cr and Co are contained in the layers above and below the separation layer.

According to Embodiment 2, the auxiliary recording layer 126 is composed of two layers of the granular auxiliary recording layer 126a and the non-granular auxiliary recording layer 126b. First, the non-granular auxiliary recording layer 126b will be described. The non-granular auxiliary recording layer 126b is a magnetic layer almost magnetically continuous in the in-plane direction of the main surface of the substrate. The non-granular auxiliary recording layer 126b needs to be adjacent or close to the magnetic recording layer 122 so as to have a magnetic interaction on the magnetic recording layer 122. The non-granular auxiliary recording layer 126b can be composed of, for example, CoCrPt, CoCrPtB, or any substance obtained by incorporating minute amounts of oxides into them. An object of the non-granular auxiliary recording layer 126b is to adjust a reverse magnetic domain nucleus forming magnetic field Hn and a coercive force Hc and to thereby improve thermal fluctuation resistance, OW characteristics, and SNR. In order to attain this object, the non-granular auxiliary recording layer 126b preferably has high perpendicular magnetic anisotropy Ku and saturation magnetization Ms.

Note that "magnetically continuous" means that magnetism continues without interruption. "Almost continuous" means that the non-granular auxiliary recording layer 126b may be not necessarily a single magnet when observed as a whole and may have partially discontinuous magnetism due to the grain boundary of magnetic particles. In the grain boundary, not only crystals may be discontinuous, but also Cr may precipitates, or may be caused to precipitate by incorporating minute amounts of oxides thereinto. However, even if the grain boundary containing oxide is formed in the non-granular auxiliary recording layer 126b, the area of the grain boundary is preferably smaller (less content of oxide) than that in the magnetic recording layer 122. Although the function and effect of the non-granular auxiliary recording layer 126b are not necessarily clear, it is considered that the non-granular auxiliary recording layer 126b has a magnetic interaction (makes exchange coupling) with the granular magnetic particles in the magnetic recording layer 122, thereby adjusting Hn and Hc to improve thermal fluctuation resistance and SNR. It is also considered that a crystal grain which is linked to a granular magnetic particle (a crystal grain having a magnetic interaction therewith) has a larger cross sectional area than the granular magnetic particle, thereby receiving more magnetic fluxes from a magnetic head and causing magnetization reversal more easily, consequently leading to the improvement in the whole OW characteristics.

Figure 4:
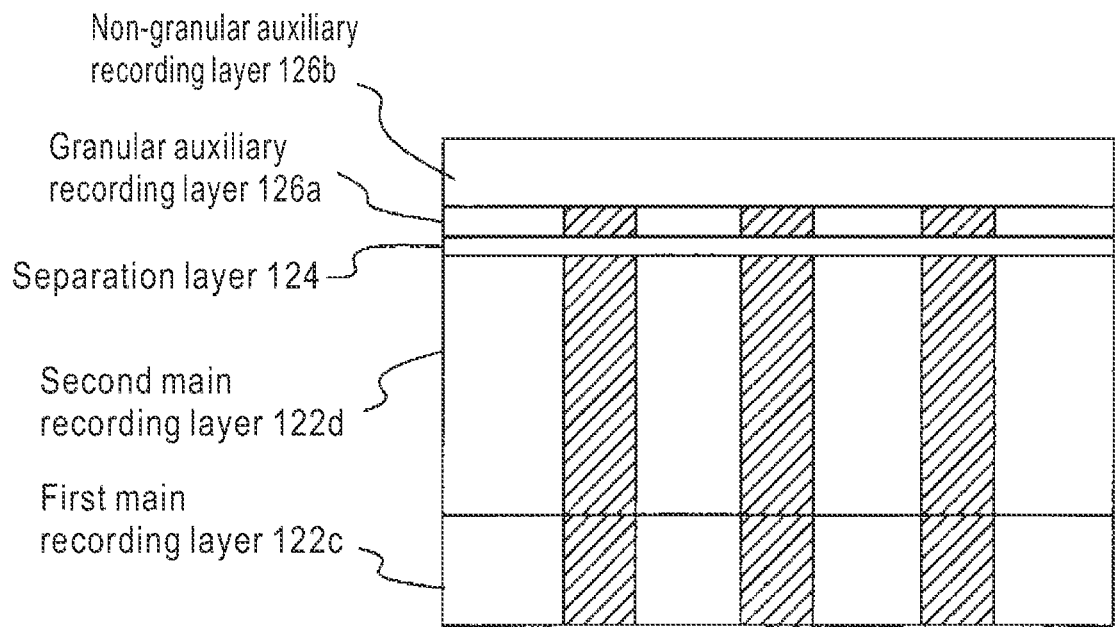
FIG. 4 illustrates a layer structure from a main recording layer to an auxiliary recording layer of FIG. 3.

FIG. 4 illustrates a layer structure from the main recording layer to the auxiliary recording layer. According to Embodiment 2, the granular auxiliary recording layer 126a, which has higher coercive force than the non-granular auxiliary recording layer 126b and has a granular structure, is provided below the non-granular auxiliary recording layer 126b. In FIG. 4, a shaded area shows granular magnetic particles. The granular auxiliary recording layer 126a is magnetically separated from the second main recording layer 122d by the separation layer 124, and can reverse its magnetization direction independently from the second main recording layer 122d. Then, the granular auxiliary recording layer 126a exerts a magnetic interaction on the non-granular auxiliary recording layer 126b, thereby acting to make it hard to reverse the magnetization direction of the auxiliary recording layer 126. Note that the thickness of the separation layer 124 deposited is so extremely thin (approximately 0.7 nm) that the granular auxiliary recording layer 126a grows its crystals in succession to the granular structure of the second main recording layer 122d.

According to the above-mentioned configuration, the granular auxiliary recording layer 126a having higher coercive force acts as a pin layer of the non-granular auxiliary recording layer 126b. Therefore, while more blurred writing are generally caused when a thicker auxiliary recording layer is used, a track width can be made narrower (blurred writing can be reduced) and SNR can be improved even if a thicker auxiliary recording layer is provided. Thus, compatibility between a track width and SNR can be achieved.

The above-mentioned granular auxiliary recording layer 126a has lower at % of Cr and higher at % of CoPt than the first main recording layer 122c and the second main recording layer 122d. The reason is that, according to this composition, the granular auxiliary recording layer 126a has higher coercive force than the first main recording layer 122c and the second main recording layers 122d, and ideally acts as a pin layer of the non-granular auxiliary recording layer 126b.

According to Embodiment 2, the difference (A−B) between the Cr concentration (A) of the magnetic recording layer 122 and the Cr concentration (B) of the granular auxiliary recording layer 126a is not less than 1 at % and not more than 4 at %. Compared to the first main recording layer 122c and the second main recording layer 122d, at % of Cr is made smaller and at % of CoPt is made larger to increase coercive force.

According to Embodiment 2, the granular auxiliary recording layer 126a has thinner film thickness than the non-granular auxiliary recording layer 126b. The reason for this is that, if the non-granular auxiliary recording layer 126b is made thinner, recording itself will be impossible, therefore the thickness of the non-granular auxiliary recording layer is maintained to keep OW characteristics, while a blurred writing is prevented by the granular auxiliary recording layer which acts as a pin layer of the non-granular auxiliary recording layer 126b. According to Embodiment 2, it is preferable that the thickness of the granular auxiliary recording layer is 0.5 to 5.0 nm, and that of the non-granular auxiliary recording layer is 4.0 to 8.0 nm.

The medium protective layer 128 can be formed by depositing carbon by a CVD method with maintaining a vacuum. The medium protective layer 128 is a layer for protecting the perpendicular magnetic recording medium 100 against impacts from a magnetic recording head. In general, as compared with carbon deposited by a sputtering method, carbon deposited by a CVD method has higher film hardness, and thereby can more effectively protect the perpendicular magnetic recording layer 100 against impacts from the magnetic recording head.

The lubricant layer 130 is deposited by coating PFPE (perfluoropolyether) by a dip-coating method. PFPE has a long-chain molecular structure and is bound to an N atom on the surface of the medium protective layer 128 with high affinity. This action of the lubricant layer 130 prevents damage or loss to the medium protective layer 128, even if the magnetic recording head makes contact with the surface of the perpendicular magnetic recording medium 100.

The examples, which were implemented to make the effects of the present invention clear, will be described bellow. Note that, in the following description, Examples 1 and 2 correspond to Embodiments 1 and 2, respectively.

Example 1

Example 1-1

An aluminosilicate-based amorphous chemically strengthened glass substrate with a smooth surface was used as a non-magnetic substrate. After being washed, the glass substrate was placed into a DC magnetron sputtering device to deposit a Cr-50Ti thin film of 10 nm in thickness (adhesive layer 12), a 92(40Fe-60Co)-3Ta-5Zr thin film of 24 nm in thickness (first soft magnetic layer), a Ru thin film of 0.5 nm in thickness (spacer layer), a 92(40Fe-60Co)-3Ta-5Zr thin film of 24 nm in thickness (second soft magnetic layer 14), a 95Ni-5W thin film of 5 nm in thickness (orientation control layer 16), a Ru thin film of 20 nm in thickness (underlayer 18), a 90(Co-14Cr-16Pt)-10(SiO$_2$) thin film of 12 nm in thickness (magnetic recording layer 20), and an oxygen-containing Co-20Cr-19Pt-3B thin film of 7 nm in thickness (auxiliary recording layer 22), and then to deposit a medium protective layer 24 composed of carbon and having a thickness of 5 nm. As for the Ar gas pressure at the time of sputtering of each metallic film except for the protective layer, the pressure is set to 0.6 Pa for the first half (10 nm in thickness) of the underlayer 18, 5.0 Pa for the second half (10 nm in thickness) of the underlayer 18, 4.0 Pa for the magnetic recording layer 20, and 0.6 Pa for other layers. Then, the glass substrate was removed from the DC magnetron sputtering device, and was washed before being applied with a lubricant (PFPE) by a dip-coating method, and then was baked to form a lubricant layer 26 of 1 nm in thickness. Thus produced was a magnetic disk of Example 1-1 for a recording capacity of 250 G bits per square inch. The auxiliary recording layer 22 was deposited by reactive sputtering where oxygen gas was incorporated into treatment gas (Ar gas) at a partial pressure of 3%, and then the oxygen content was confirmed to be 3 mol %.

Example 1-2

A magnetic disk of Example 1-2 was produced in the same manner as in Example 1-1, except that instead of the oxygen-containing Co-20Cr-19Pt-3B thin film of 7 nm in thickness, an auxiliary recording layer 22 of 7 nm in thickness was formed by sputtering with use of a 98(Co-20Cr-19Pt-3B)-2 (CuO) target.

Example 1-3

A magnetic disk of Example 1-3 was produced in the same manner as in Example 1-1, except that instead of the oxygen-containing Co-20Cr-19Pt-3B thin film of 7 nm in thickness, an auxiliary recording layer 22 of 7 nm in thickness was formed by sputtering with use of a 98(Co-20Cr-19Pt-3B)-2 (CoO) target.

Example 1-4

A magnetic disk of Example 1-4 was produced in the same manner as in Example 1-1, except that instead of the oxygen-containing Co-20Cr-19Pt-3B thin film of 7 nm in thickness, an auxiliary recording layer 22 of 7 nm in thickness was formed by sputtering with use of a 98(Co-20Cr-19Pt-3B)-2 ($SiO_2$) target.

Example 1-5

A magnetic disk of Example 1-5 was produced in the same manner as in Example 1-1, except that instead of the oxygen-containing Co-20Cr-19Pt-3B thin film of 7 nm in thickness, an auxiliary recording layer 22 of 7 nm in thickness was formed by sputtering with use of a 98(Co-20Cr-19Pt-3B)-2 ($TiO_2$) target.

Example 1-6

A magnetic disk of Example 1-6 was produced in the same manner as in Example 1-1, except that instead of the oxygen-containing Co-20Cr-19Pt-3B thin film of 7 nm in thickness, an auxiliary recording layer 22 of 7 nm in thickness was formed by sputtering with use of a 94(Co-20Cr-19Pt-3B)-6 (CuO) target.

Comparative Example 1-1

A magnetic disk of Comparative Example 1-1 was produced in the same manner as in Example 1-1, except that instead of the oxygen-containing Co-20Cr-19Pt-3B thin film of 7 nm in thickness, an auxiliary recording layer 22 was formed which is composed of a Co-20Cr-19Pt-3B thin film of 7 nm in thickness.

Comparative Example 1-2

A magnetic disk of Comparative Example 1-1 was produced in the same manner as in Example 1-1, except that instead of the oxygen-containing Co-20Cr-19Pt-3B thin film of 7 nm in thickness, an auxiliary recording layer 22 was formed which is composed of a 92(Co-20Cr-19Pt-3B)-8 (Cuo) thin film of 7 nm in thickness.

The magnetic disks of Examples 1-1 to 1-6 and Comparative Examples 1-1 and 1-2 were investigated for track width (magnetic write width (MWW)) and bit error rate (digit). The results are shown in Table 1 below. Note that the bit error rate was calculated by the following formula (1), after 107 pieces of known random data were recorded at 1300 kFCI (overwrite characteristics) using a spin stand and the number of reading errors was counted. In addition, the magnetic write width was calculated from the track profile using the spin stand.

$$bER = \log(\text{number of errors/number of data pieces}) \quad \text{Formula (1)}$$

TABLE 1

|  | Auxiliary recording layer | Process | Oxygen content (mol %) | Track width (nm) | Bit error rate (digit) |
|---|---|---|---|---|---|
| Example 1-1 | Co—20Cr—19Pt—3B | Reactive sputtering | 3 | 108 | −6.1 |
| Example 1-2 | 98(Co—20Cr—19Pt—3B)—2(CuO) | Sputtering | 1 | 106 | −6.5 |
| Example 1-3 | 98(Co—20Cr—19Pt—3B)—2(CoO) | Sputtering | 1 | 106 | −6.3 |
| Example 1-4 | 98(Co—20Cr—19Pt—3B)—2($Si_2O$) | Sputtering | 2 | 107 | −5.7 |
| Example 1-5 | 98(Co—20Cr—19Pt—3B)—2($Ti_2O$) | Sputtering | 2 | 109 | −5.8 |
| Example 1-6 | 94(Co—20Cr—19Pt—3B)—6(CuO) | Sputtering | 3 | 106 | −5.8 |
| Comparative Example 1-1 | Co—20Cr—19Pt—3B | Sputtering | 0 | 107 | −5.2 |
| Comparative Example 1-2 | 92(Co—20Cr—19Pt—3B)—8(CuO) | Sputtering | 4 | 106 | −5.2 |

As can be seen from Table 1, the bit error rates of the magnetic disks of Examples 1-1 to 1-6 were relatively lower. The reason for this is considered that with 0.1 to 3 mol % of oxygen contained in the auxiliary recording layers, structural non-uniformity caused in the course of laminating the auxiliary recording layer was able to be reduced, and accordingly noise from the auxiliary recording layer resulting from the non-uniformity was reduced. On the other hand, the bit error rate of the magnetic disk of Comparative Example 1-1 was relatively higher. The reason for this is considered that without any oxygen contained in the auxiliary recording layer, the grain boundary portion present between magnetic particles became unstable and the film uniformity degraded, thereby noise became larger. The bit error rate of the magnetic disk of Comparative Example 1-2 was also relatively higher compared to that of the magnetic disks of Examples 1-1 to 1-6. The reason for this is considered that with more than 3 mol % (4 mol %) of oxygen contained in the auxiliary recording layer, the magnetic continuity in the in-plane direction of the magnetic disk was excessively lost, thereby the overwrite characteristics deteriorated. Note that the track widths in any Examples were within the range of ±2 nm of the values in Comparative Examples, and can be therefore considered equivalent in view of a measurement error.

Next, examples will be described where a magnetic recording layer is formed so as to contain two or more oxides.

Example 1-7

A magnetic disk of Example 1-7 was produced in the same manner as in Example 1-1, except that instead of the 90(Co- 14Cr-16Pt)-10(SiO$_2$) thin film of 12 nm in thickness, a magnetic recording layer 20 of 12 nm in thickness was formed by sputtering with use of a 90(Co-14Cr-16Pt)-5(SiO$_2$)-5(TiO$_2$) target, and instead of the oxygen-containing Co-20Cr-19Pt-3B thin film of 7 nm in thickness, an auxiliary recording layer 22 of 7 nm in thickness was formed by sputtering with use of a 98(Co-20Cr-19Pt-3B)-2(CuO) target.

Example 1-8

A magnetic disk of Example 1-8 was produced in the same manner as in Example 1-1, except that instead of the 90(Co-14Cr-16Pt)-10(SiO$_2$) thin film of 12 nm in thickness, a magnetic recording layer 20 of 12 nm in thickness was formed by sputtering with use of a 89(Co-14Cr-16Pt)-5(SiO$_2$)-5(TiO$_2$)-

(TiO$_2$) target, and instead of the oxygen-containing Co-20Cr-19Pt-3B thin film of 7 nm in thickness, an auxiliary recording layer 22 of 7 nm in thickness was formed by sputtering with use of a 98(Co-20Cr-19Pt-3B)-2(CuO) target.

The magnetic disks of Examples 1-7 to 1-11 were investigated for magnetic write width (MWW) and bit error rate (digit). The results are shown in Table 2 below. Note that the bit error rate was calculated by the above-mentioned formula (1), after 107 pieces of known random data were recorded at 1300 kFCI (overwrite characteristics) using a spin stand and the number of reading errors was counted. In addition, the magnetic write width was calculated from the track profile using the spin stand.

TABLE 2

|  | Magnetic recording layer | Auxiliary recording layer | Oxygen content (mol %) | Track width (nm) | Bit error rate (digit) |
| --- | --- | --- | --- | --- | --- |
| Example 1-7 | 90(Co—14Cr—16Pt)—5(SiO$_2$)—5(TiO$_2$) | 98(Co—20Cr—19Pt—3B)—2(CuO) | 1 | 104 | −6.8 |
| Example 1-8 | 89(Co—14Cr—16Pt)—5(SiO$_2$)—5(TiO$_2$)—1(Co$_3$O$_4$) | 98(Co—20Cr—19Pt—3B)—2(CuO) | 1 | 101 | −6.9 |
| Example 1-9 | 90(Co—14Cr—16Pt)—5(SiO$_2$)—5(TiO$_2$) | 98(Co—20Cr—19Pt—3B)—2(CuO) | 1 | 105 | −6.6 |
| Example 1-10 | 89(Co—14Cr—16Pt)—5(SiO$_2$)—5(TiO$_2$)—1(Co$_3$O$_4$) | 98(Co—20Cr—19Pt—3B)—2(CuO) | 1 | 101 | −6.7 |
| Example 1-11 | 90(Co—14Cr—16Pt)—10(TiO$_2$) | 98(Co—20Cr—19Pt—3B)—2(CuO) | 1 | 106 | −6.7 |

1(Co$_3$O$_4$) target, and instead of the oxygen-containing Co-20Cr-19Pt-3B thin film of 7 nm in thickness, an auxiliary recording layer 22 of 7 nm in thickness was formed by sputtering with use of a 98(Co-20Cr-19Pt-3B)-2(CuO) target.

Example 1-9

A magnetic disk of Example 1-9 was produced in the same manner as in Example 1-1, except that instead of the 90(Co-14Cr-16Pt)-10(SiO$_2$) thin film of 12 nm in thickness, a magnetic recording layer 20 of 12 nm in thickness was formed by sputtering with use of a 90(Co-14Cr-16Pt)-5(SiO$_2$)-5(TiO$_2$) target, and instead of the oxygen-containing Co-20Cr-19Pt-3B thin film of 7 nm in thickness, an auxiliary recording layer 22 of 7 nm in thickness was formed by sputtering with use of a 98(Co-20Cr-19Pt-3B)-2(CoO) target.

Example 1-10

A magnetic disk of Example 1-10 was produced in the same manner as in Example 1-1, except that instead of the 90(Co-14Cr-16Pt)-10(SiO$_2$) thin film of 12 nm in thickness, a magnetic recording layer 20 of 12 nm in thickness was formed by sputtering with use of a 89(Co-14Cr-16Pt)-5(SiO$_2$)-5(TiO$_2$)-1(Co$_3$O$_4$) target, and instead of the oxygen-containing Co-20Cr-19Pt-3B thin film of 7 nm in thickness, an auxiliary recording layer 22 of 7 nm in thickness was formed by sputtering with use of a 98(Co-20Cr-19Pt-3B)-2(CoO) target.

Example 1-11

A magnetic disk of Example 1-11 was produced in the same manner as in Example 1-1, except that instead of the 90(Co-14Cr-16Pt)-10(SiO$_2$) thin film of 12 nm in thickness, a magnetic recording layer 20 of 12 nm in thickness was formed by sputtering with use of a 90(Co-14Cr-16Pt)-10

According to Table 2, it was confirmed that the magnetic recording layer having two or more oxides improved the characteristics better. The reason for this is as follows. In the magnetic layer with a granular structure, which is deposited by sputtering, such as 90(Co-14Cr-16Pt)-10(SiO$_2$), oxygen is depleted, and consequently Si is incorporated into the inside of magnetic particles (CCP), deteriorating magnetic anisotropy energy, but oxygen depletion can be compensated by mixing oxides thereinto. In addition, Example 1-8 shows the best characteristics. The reason for this is considered that Co oxide has higher Gibbs energy (is unstable as an oxide), so that Co and O can be easily separated, and that the separated Co is incorporated into the inside of a magnetic layer to allow O to compensate oxygen depletion in Si or Ti. Here, CO$_3$O$_4$ was used, but CoO may be used.

Next, examples will be described where a separation layer is formed between the magnetic recording layer and the auxiliary recording layer.

Example 1-12

A magnetic disk of Example 1-12 was produced in the same manner as in Example 1-8, except that a separation layer was formed between the magnetic recording layer and the auxiliary recording layer. The separation layer was formed of a Ru thin film of 0.3 nm in thickness by sputtering at an Ar gas pressure of 0.6 Pa.

Example 1-13

A magnetic disk of Example 1-13 was produced in the same manner as in Example 1-8, except that a separation layer was formed between the magnetic recording layer and the auxiliary recording layer. The separation layer was formed of a Ru-10(WO$_3$) thin film of 0.5 nm in thickness by sputtering at an Ar gas pressure of 0.6 Pa.

Example 1-14

A magnetic disk of Example 1-14 was produced in the same manner as in Example 1-8, except that a separation layer was formed between the magnetic recording layer and the auxiliary recording layer. The separation layer was formed of a Ru-50Co thin film of 0.4 nm in thickness by sputtering at an Ar gas pressure of 0.6 Pa.

The magnetic disks of Examples 1-12 to 1-14 were investigated for magnetic write width (MWW) and bit error rate (digit). The results are shown in Table 3 below.

TABLE 3

|  | Separation layer | Film thickness (nm) | Track width (nm) | Bit error rate (digit) |
|---|---|---|---|---|
| Example 1-8 | None | 0 | 101 | −6.9 |
| Example 1-12 | Ru | 0.3 | 98 | −7.2 |
| Example 1-13 | Ru—10(WO$_3$) | 0.5 | 98 | −7.4 |
| Example 1-14 | Ru—50Co | 0.4 | 97 | −7.5 |

According to Table 3, it was confirmed that the characteristics were improved by interposing the separation layer between the magnetic recording layer and the auxiliary recording layer.

Next, examples will be described where a magnetic recording layer is formed of two or more layers.

Example 1-15

A magnetic disk of Example 1-15 was produced in the same manner as in Example 1-12, except that a magnetic disk was configured so as to have a laminated structure (three-layered structure). The laminated structure of the magnetic recording layer was deposited in three stages by sputtering with use of an 89(Co-14Cr-16Pt)-5(SiO$_2$)-5(TiO$_2$)-1(CO$_3$O$_4$) target so as to have a total thickness of 12 nm.

Example 1-16

A magnetic disk of Example 1-16 was produced in the same manner as in Example 1-12, except that a magnetic disk was configured so as to have a laminated structure (two-layered structure). The laminated structure of the magnetic recording layer was deposited in two stages by sputtering with use of an 89(Co-14Cr-16Pt)-5(SiO$_2$)-5(TiO$_2$)-1(CO$_3$O$_4$) target so as to have a total thickness of 12 nm. The two-stage deposition may be performed by using different chambers, or by forming a film with a specified film thickness, removing the film from a chamber once, and then putting it into the chamber again.

The magnetic disks of Examples 1-15 and 1-16 were investigated for magnetic write width (MWW) and bit error rate (digit). The results are shown in Table 4 below.

Figure 6:
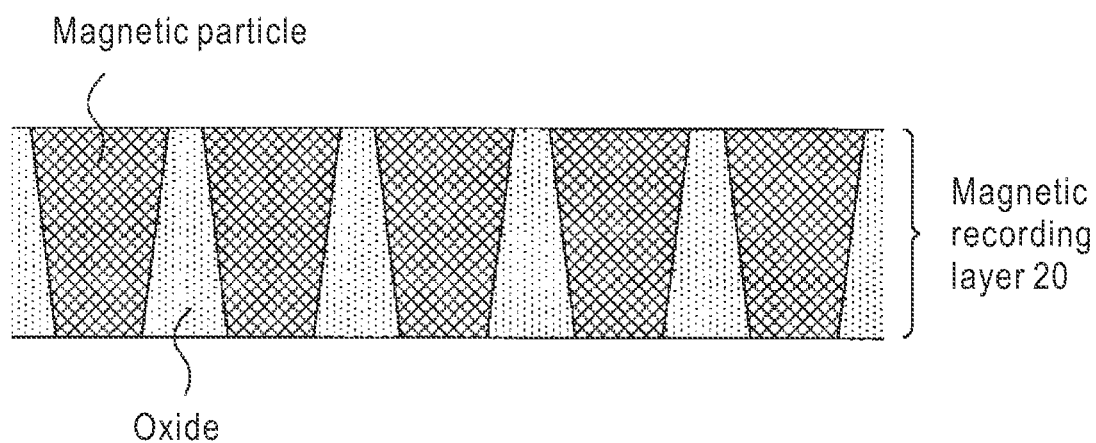
FIG. 6 illustrates growth of magnetic particles in the case where a magnetic layer which constitutes a magnetic recording layer is formed by a single deposition.

According to Table 4, it was confirmed that the characteristics were improved by providing a magnetic recording layer with a laminated structure. The reason for this is considered as follows. Magnetic particles will be gradually enlarged if a magnetic layer is formed by a single deposition (refer to FIG. 6). However, by performing a deposition in two or more stages to obtain a laminated structure, the enlargement of magnetic particles was prevented and the diameters of the particles in the layers from a lower layer to an upper layer were able to be made uniform. As a result, the magnetic coupling between the magnetic particles in the magnetic recording layer 20 became uniform in the depth direction, so that a medium closer to that of an ideal structure as shown in FIG. 2 can be obtained in synergy with the separation effect of adding oxygen to the auxiliary recording layer.

Example 2

On the disk substrate 110, films from the adhesion layer 112 to the auxiliary recording layer 126 were sequentially disposed in an Ar atmosphere by DC magnetron sputtering with use of a vacuumed film forming device. Note that an Ar gas pressure at the time of sputtering deposition was set to 0.6 Pa, unless otherwise specified. An adhesion layer 112 of 10 nm was formed using a Cr-50Ti target. As for a soft magnetic layer, a first soft magnetic layer 114a and a second soft magnetic layer 114c both of 20 nm were deposited using a 92(Co-40Fe)-3Ta-5Zr target, and a spacer layer 114b of 0.7 nm was deposited using a Ru target. A primary underlayer 116 of 5 nm was deposited using a Ni-5W target. A first underlayer 118a of 10 nm was deposited at 0.6 Pa using a Ru target. A second underlayer 118b of 10 nm was deposited at 5.0 Pa using a Ru target. A non-magnetic granular layer 120 of 1 nm was deposited at 4 Pa using an 88(Co-40Cr)-12(SiO$_2$) target. A lower recording layer 122a of 2.0 nm was formed at 4 Pa using a (Co-12Cr-16Pt)-2.5(Cr$_2$O$_5$)-2.5 (SiO$_2$) target. An interposed layer 122b of 0.4 nm was formed using a Ru target. A first main recording layer 122c of 4 nm was formed at 4 Pa using a 90(Co-12Cr-16Pt)-5(SiO$_2$)-5(TiO$_2$) target. A second main recording layer 122d of 6 nm was formed at 4 Pa using a 90 (Co-12Cr-16Pt)-4.5 (SiO$_2$)-4.5 (TiO$_2$)-1(CO$_3$O$_4$) target. A separation layer 124 of 0.5 nm was formed using a Ru-10(WO$_2$) target. A granular auxiliary recording layer 126a of a specified thickness was deposited at 4 Pa using a 90(Co—Cr—Pt)-5(SiO$_2$)-5(TiO$_2$) target. The detailed composition and thickness of Co—Cr—Pt were set to the values described below. A non-granular auxiliary recording layer 126b of 6.4 nm was formed using a Co-18Cr-15Pt-5B target. A medium protective layer 128 was deposited by a CVD

TABLE 4

| | Magnetic recording layer | | |
|---|---|---|---|
| | First layer | Second layer | |
| Example 1-12 | 89(Co—14Cr—16Pt)—5(SiO$_2$)—5(TiO$_2$)—1(Co$_3$O$_4$) | — | |
| Example 1-15 | 89(Co—14Cr—16Pt)—5(SiO$_2$)—5(TiO$_2$)—1(Co$_3$O$_4$) | 89(Co—14Cr—16Pt)—5(SiO$_2$)—5(TiO$_2$)—1(Co$_3$O$_4$) | |
| Example 1-16 | 89(Co—14Cr—16Pt)—5(SiO$_2$)—5(TiO$_2$)—1(Co$_3$O$_4$) | 89(Co—14Cr—16Pt)—5(SiO$_2$)—5(TiO$_2$)—1(Co$_3$O$_4$) | |

| | Magnetic recording layer Third layer | Track width (nm) | Bit error rate (digit) |
|---|---|---|---|
| Example 1-12 | — | 98 | −7.2 |
| Example 1-15 | 89(Co—14Cr—16Pt)—5(SiO$_2$)—5(TiO$_2$)—1(Co$_3$O$_4$) | 95 | −7.6 |
| Example 1-16 | — | 97 | −7.4 | method with use of $C_2H_4$, and a lubricant layer 130 was formed by a dip-coating method with use of PFPE.

FIG. 5 shows comparisons of track widths and SNRs between Examples 2-1 to 2-9, where a granular auxiliary recording layer 126a of a varied film thickness is included, and Comparative Examples 2-1 and 2-2. FIGS. 5(a) and 5(b) show tabulated and plotted data, respectively.

In any of Examples and Comparative Examples, the composition and film thickness of the CoCrPt metallic phase in the granular auxiliary recording layer 126a were changed with an at % ratio of Co:Cr:Pt of the metallic phase in the main recording layer set to 72Co-12Cr-16Pt. Note that the main recording layer and the granular auxiliary recording layer have the same number of moles of oxide.

In Examples 2-1 to 2-3 (denoted by "♦" in the graph), the at % ratio of Co:Cr:Pt of the granular auxiliary recording layer 126a was set to 73Co-11Cr-16Pt, and the film thicknesses for the respective Examples were made into 1.4 nm, 2.6 nm, and 3.6 nm, respectively. In Examples 2-4 and 2-5 (denoted by "■" in the graph), the at % ratio was set to 76Co-8Cr-16Pt, and the film thicknesses for the respective examples were made into 0.7 nm and 1.4 nm, respectively. In Examples 2-6 and 2-7 (denoted by "▲" in the graph), the at % ratio was set to 77Co-7Cr-16Pt, and the film thicknesses for the respective examples were made into 0.7 nm and 1.4 nm, respectively. In Examples 2-8 and 2-9 (denoted by "●" in the graph), the at % ratio was set to 72Co-12Cr-16Pt, and the film thicknesses for the respective examples were made into 1.4 nm and 2.5 nm, respectively.

In addition, in Comparative Examples 2-1 and 2-2 (denoted by "○" in the graph), no granular auxiliary recording layer 126a was formed. In oxide-containing layers such as the granular auxiliary recording layer 126a, the coercive force Hc is varied depending on the content of oxide and the composition of the main phase of CoCrPt. Especially, when the content of Cr, which has diamagnetism, is increased, the magnetism of Co is canceled and the coercive force Hc decreases.

Moreover, as shown in FIG. 5(a), the granular auxiliary recording layers 126a of Examples 2-1 to 2-9 had a thinner film thickness than the non-granular auxiliary recording layers 126b.

As shown in FIG. 5(b), when the film thickness of each material of a granular auxiliary recording layer is made thicker, track width tends to be larger and SNR to be higher. This suggests that, under the dependence on the film thickness of the granular auxiliary recording layer, track width and SNR are in a trade-off relation, and a recording density cannot be thereby improved. On the other hand, from the viewpoint of the existence or absence of the granular auxiliary recording layer, it was found that even in consideration of the trade-off mentioned above, the characteristics were improved better in Examples 2-1 to 2-9 than in Comparative Examples 2-1 and 2-2, and that compatibility between track width and SNR were achieved.

Preferred embodiments of the present invention have been described above with reference to the attached drawings. However, needless to say, the present invention is not meant to be limited by Embodiments 1 and 2 and Examples 1 and 2. It is apparent that a person skilled in the art can conceive various modifications and alterations within the scope as described in the scope of the claims. As a matter of course, it is to be interpreted that such modifications and alterations also belong to the technical scope of the present invention.

INDUSTRIAL APPLICABILITY

The present invention can be used as a perpendicular magnetic disk mounted in an HDD of a perpendicular magnetic recording system or the like.

The present invention is based on Japanese Patent Applications No. 2008-311120 filed on Dec. 5, 2008, and No. 2009-087762 filed on Mar. 31, 2009, the entire contents of which are incorporated herein by reference.

The invention claimed is:

1. A magnetic disk comprising:
a disk substrate,
a magnetic recording layer disposed on said disk substrate and having a granular structure where non-magnetic grain boundary portions were formed between magnetic particles composed of CoCrPt and continuously growing in a columnar shape, said magnetic recording layer comprising a first main recording layer formed over the substrate and a second main recording layer formed over the first main recording layer;
an auxiliary recording layer formed on the magnetic recording layer; and
a separation layer comprising Ru or a Ru compound and having a thickness in the range of 0.1 nm to 1.0 nm and being disposed between the granular magnetic layer and the auxiliary layer,
wherein the auxiliary recording layer includes:
a non-granular auxiliary recording layer which is a magnetic layer almost magnetically continuous in the in-plane direction of the main surface of the disk substrate and comprises crystal grains having a larger cross sectional area than granular magnetic particles in the magnetic recording layer and having magnetic interaction with said granular magnetic particles; and
a granular auxiliary recording layer which is provided below the non-granular auxiliary recording layer, has higher coercive force than the non-granular auxiliary recording layer, and has a granular structure, and
wherein the granular auxiliary recording layer has a higher coercive force than the first main recording layer and the second main recording layer.

2. The magnetic disk according to claim 1, wherein the auxiliary recording layer contains 0.1 to 3 mol % of oxygen, and
wherein the oxygen is contained in the auxiliary recording layer in a state of an oxide.

3. The magnetic disk according to claim 2, wherein the oxide is a precipitate from the separation layer on the non-magnetic regions of the granular magnetic recording layer and Ru is a precipitate on the magnetic particles.

4. The magnetic disk according to any one of claims 2, 3 and 1, wherein the granular magnetic recording layer contains oxygen, and the amount of oxygen contained in the auxiliary recording layer is less than that in the granular magnetic recording layer.

5. The magnetic disk according to any one of claims 2, 3 and 1, wherein oxygen is contained in the granular magnetic recording layer and the oxygen has two or more kinds of oxides mixed therein.

6. The magnetic disk according to any one of claims 2, 3 and 1, wherein the separation layer is non-magnetic.

7. The magnetic disk according to any of claims 2, 3 and 1, wherein the magnetic recording layer comprises at least a third main recording layer.

8. The magnetic disk according to claim 1, wherein the granular auxiliary recording layer has lower at % of Cr and higher at % of CoPt than the magnetic recording layer.

9. The magnetic disk according to claim 8, wherein the difference (A–B) of a Cr concentration (A) of the magnetic recording layer and a Cr concentration (B) of the granular auxiliary recording layer is not less than 1 at % and not more than 4 at %.

10. The magnetic disk according to claim 1 or 8, wherein the granular auxiliary recording layer has thinner film thickness than the non-granular auxiliary recording layer.

11. The magnetic disk according to claim 10, wherein a thickness of the granular auxiliary recording layer is within a range of 0.5 nm to 5.0 nm and a thickness of the non-granular auxiliary recording layer is within a range of 4.0 nm-8.0 nm.

12. The magnetic disk according to claim 1, wherein said separation layer further comprises oxides selected from the group consisting of oxides of W, Ti and Ru.

13. The magnetic disk according to claim 1, wherein a thickness of the granular auxiliary recording layer is within a range of 0.5 nm to 5.0 nm and a thickness of the non-granular auxiliary recording layer is within a range of 4.0 nm-8.0 nm.

14. The magnetic disk according to claim 1, wherein the auxiliary recording layer has a thickness in a range of 5 nm to 10 nm.

\* \* \* \* \*